US012241809B2

(12) United States Patent
Box et al.

(10) Patent No.: US 12,241,809 B2
(45) Date of Patent: *Mar. 4, 2025

(54) TIRE DEFECT DETECTION SYSTEM THAT IMAGES LOCALIZED COOLING AT A DEFECT

(71) Applicant: Paul E. Hawkinson Company, St. Michael, MN (US)

(72) Inventors: Gary William Box, Golden Valley, MN (US); Brian B. Brasch, Fargo, ND (US); Anthony S. Rike, Ramsey, MN (US)

(73) Assignee: Paul E. Hawkinson Company, St. Michael, MN (US)

( * ) Notice: Subject to any disclaimer, the term of this patent is extended or adjusted under 35 U.S.C. 154(b) by 29 days.

This patent is subject to a terminal disclaimer.

(21) Appl. No.: 18/450,904

(22) Filed: Aug. 16, 2023

(65) Prior Publication Data

US 2023/0400388 A1    Dec. 14, 2023

Related U.S. Application Data

(63) Continuation of application No. 17/369,347, filed on Jul. 7, 2021, now Pat. No. 11,733,126.

(51) Int. Cl.
| | |
|---|---|
| *G01M 17/02* | (2006.01) |
| *B60C 25/00* | (2006.01) |
| *B60C 25/05* | (2006.01) |

(52) U.S. Cl.
CPC ......... *G01M 17/027* (2013.01); *B60C 25/002* (2013.01); *B60C 25/0554* (2013.01)

(58) Field of Classification Search
CPC . G01M 17/027; B60C 25/0554; G01N 21/35; G01N 25/72; G06T 2207/10048; G01K 3/10

(Continued)

(56) References Cited

U.S. PATENT DOCUMENTS

| | | | |
|---|---|---|---|
| 1,779,907 | A | 10/1930 | Dye |
| 3,465,242 | A | 9/1969 | Gruetzmacher |

(Continued)

FOREIGN PATENT DOCUMENTS

| | | | | |
|---|---|---|---|---|
| CN | 112461895 A | * | 3/2021 | ............ G01N 25/72 |
| JP | 2005283452 A | | 10/2005 | |

OTHER PUBLICATIONS

PCT International Patent Search and Written Opinion for PCT/US21/47266; Nov. 16, 2021.

*Primary Examiner* — Eric S. McCall
*Assistant Examiner* — Timothy P Graves
(74) *Attorney, Agent, or Firm* — Neustel Law Offices

(57) ABSTRACT

A tire defect detection system for detecting defects in a tire. The system includes at least one infrared camera, a pneumatic source and a computing device. The pneumatic source inflates the tire to a predetermined pressure. After inflation, the infrared camera captures a reference frame of a section of the tire. A period of time after capturing the reference frame, the infrared camera captures a subsequent frame. The subsequent frame is compared to the reference frame to detect a portion of the section of the tire that has a lower temperature. The lower temperature is caused by an escape of air from the tire through a defect. The escaping air cools the area of the tire around the defect, so a decrease in temperature indicates the defect.

20 Claims, 17 Drawing Sheets

(58) Field of Classification Search
USPC .......................................................... 73/146
See application file for complete search history.

(56) References Cited

U.S. PATENT DOCUMENTS

| | | | |
|---|---|---|---|
| 4,297,876 A | 11/1981 | Weiss | |
| 4,327,579 A | 5/1982 | Weiss | |
| 4,365,514 A | 12/1982 | Ho | |
| 4,372,366 A | 2/1983 | Dugger | |
| 4,516,068 A | 5/1985 | Hawkinson, Jr. | |
| 4,520,307 A | 5/1985 | Weiss | |
| 4,936,138 A | 6/1990 | Cushman | |
| 5,531,109 A | 7/1996 | Tsagas | |
| 5,992,227 A | 11/1999 | Jellison | |
| 6,050,136 A | 4/2000 | Hawkinson | |
| 6,269,689 B1 | 8/2001 | Alexander | |
| 6,304,090 B1 | 10/2001 | Weiss | |
| 6,600,326 B2 | 7/2003 | Weiss | |
| 6,832,513 B2 | 12/2004 | Weiss | |
| 6,837,102 B2 | 1/2005 | Weiss | |
| 6,907,777 B2 | 6/2005 | Weiss | |
| 7,021,132 B2 | 4/2006 | Nigon | |
| 7,096,727 B2 | 8/2006 | Adamson | |
| 7,302,836 B2 | 12/2007 | Hattori | |
| 7,439,928 B2 | 10/2008 | Forster | |
| 7,782,303 B2 | 8/2010 | Chou | |
| 7,882,742 B1 | 2/2011 | Martens | |
| 8,487,640 B2 | 7/2013 | Bradley | |
| 8,910,511 B2 | 12/2014 | Beccavin | |
| 11,733,126 B2 * | 8/2023 | Box | B60C 25/002 73/146 |
| 2002/0011849 A1 | 1/2002 | Weiss | |
| 2005/0134444 A1 | 6/2005 | Park | |
| 2008/0147347 A1 | 6/2008 | Shaw | |
| 2009/0078034 A1 | 3/2009 | Range | |
| 2013/0099123 A1 * | 4/2013 | De Amicis | G01N 21/95 250/341.6 |
| 2013/0139581 A1 | 6/2013 | Range | |
| 2014/0260584 A1 | 9/2014 | Range | |
| 2016/0131555 A1 | 5/2016 | Range | |

* cited by examiner

TIRE DEFECT DETECTION SYSTEM THAT IMAGES LOCALIZED COOLING AT A DEFECT

CROSS REFERENCE TO RELATED APPLICATIONS

The present application is a continuation of U.S. application Ser. No. 17/369,347 filed on Jul. 7, 2021 which issues as U.S. Pat. No. 11,733,126 on Aug. 22, 2023. Each of the aforementioned patent applications is herein incorporated by reference in their entirety.

STATEMENT REGARDING FEDERALLY SPONSORED RESEARCH OR DEVELOPMENT

Not applicable to this application.

BACKGROUND

The described example embodiments in general relate to systems for detecting defects (e.g., flaws) in tires.

Present tire defect detection systems and methods require removing the tire from the vehicle, immersing the tire in a tank (e.g., dunk tank) of liquid (e.g., water), and manually inspecting the tire for bubbles that indicate air leaking from a defect in the tire. A variation of the present systems and methods requires removing the tire from the vehicle, wetting or immersing one or more portions of the tire, and manually inspecting for defects. Present systems and methods are disadvantageous because the water that is used to wet the tire is considered a hazardous waste material that must be disposed of accordingly. Further, the present systems and methods are manually intensive, time consuming, and require trained technicians. Additionally, no record is created regarding the examination of the tire and/or the results of the examination.

Tire manufacturers, installers, retailers and/or consumers may benefit from a tire defect detection system and methods that use a dry process that may be fully automated or performed by a person who is not a trained technician or while the tire is still mounted to the vehicle.

SUMMARY

Some of the various embodiments of the present disclosure relate to a using thermal (e.g., infrared) images to detect defects in a tire. The infrared images may be captured while the tire is mounted to the vehicle or they may be captured while the tire is removed from the vehicle. A reference frame (e.g., image) may be captured while the tire is deflated or after inflation of the tire. A subsequent frame may be captured after a period of time. Defects generally permit air to escape from the tire. An expanding gas experiences a decrease in temperature. As the gas expands through the defect, the decrease in the temperature of the gas decreases the temperature of the tire around the defect. The reference frame captures a thermal image of the tire before escaping air can cool the tire around the defect. The subsequent frame captures a thermal image of the tire after air has escaped from the tire and the area around the defect has been cooled. The reference frame and the subsequent frame may be compared (e.g., analyzed) to detect the portion of the tire that has cooled and thereby the location of the defect in the tire.

The tire defect detection system may detect defects in the sidewalls and or the tread of the tire. Generally, the tire defect detection system will divide the tire into sections for analysis. A reference frame and one or more subsequent frames are captured for each section and analyzed to determine whether the section has a defect. The captured frames and the results of analysis may be stored to create a record of the inspection. The system for inspecting the tire for defects may perform all of the steps for inspecting the tire except for positioning the tire on the system and removing the tire from the system. In an embodiment of the system in which the tire is inspected while still connected to the vehicle, a user merely has to drive the tire system support and place the vehicle in neutral. So, the person operates the system to inspect a tire requires little or no training and does not need to maintain a record of the test because the system creates and stores the record.

Some of the various embodiments of the present disclosure include a computing device, a pneumatic source, a tire positioner and an infrared camera. Other example embodiments of the present disclosure include a computing device, a pneumatic source, a tire positioner, a heat source, a support, a temperature sensor, a display, a server, a database, and one or more infrared cameras. Various embodiments of the present disclosure are fully automated such that the operator need merely to place the tire on the system and remove the tire from the system after testing. Other systems require the user to control the pneumatic source, manually position the tire and manually position the infrared camera. Another example embodiment does not require the tire to be removed from the vehicle for testing. In another example embodiment, the entire tire (e.g., all sections) are inspected at the same time. None of the systems require that the operator be trained to detect defects.

In some example embodiments of the present disclosure, the tire defect inspection system captures the data, analyzes the data, presents images of the data on a display, presents the results of the inspection on the display, creates a record of the inspection and stores the record of the inspection. In another example embodiment, the tire defect inspection system captures the data and transmits the data to a server, via a network, for analysis, record creation and record storage.

There has thus been outlined, rather broadly, some of the embodiments of the present disclosure in order that the detailed description thereof may be better understood, and in order that the present contribution to the art may be better appreciated. There are additional embodiments of that will be described hereinafter and that will form the subject matter of the claims appended hereto. In this respect, before explaining at least one embodiment in detail, it is to be understood that the various embodiments are not limited in its application to the details of construction or to the arrangements of the components set forth in the following description or illustrated in the drawings. Also, it is to be understood that the phraseology and terminology employed herein are for the purpose of the description and should not be regarded as limiting.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evidence to the contrary from the description, where elements in different figures use identical reference numbers, the elements are generally either identical or at least similar in function or purpose.

DETAILED DESCRIPTION

A. Overview

The tire defect detection system (e.g., system, inspection system, system for inspecting a tire), according to various aspects of the present disclosure, inspects a tire to identify defects in the tire without applying a wetting agent (e.g., water, liquid solution, soap) to the tire and without requiring an operator (e.g., user) trained in tire defect detection. The system may be fully automated or the system may allow some intervention by the operator; however, the ability and accuracy of the system in detecting defects does not depend on the skill, training or expertise of the operator.

Figure 10:
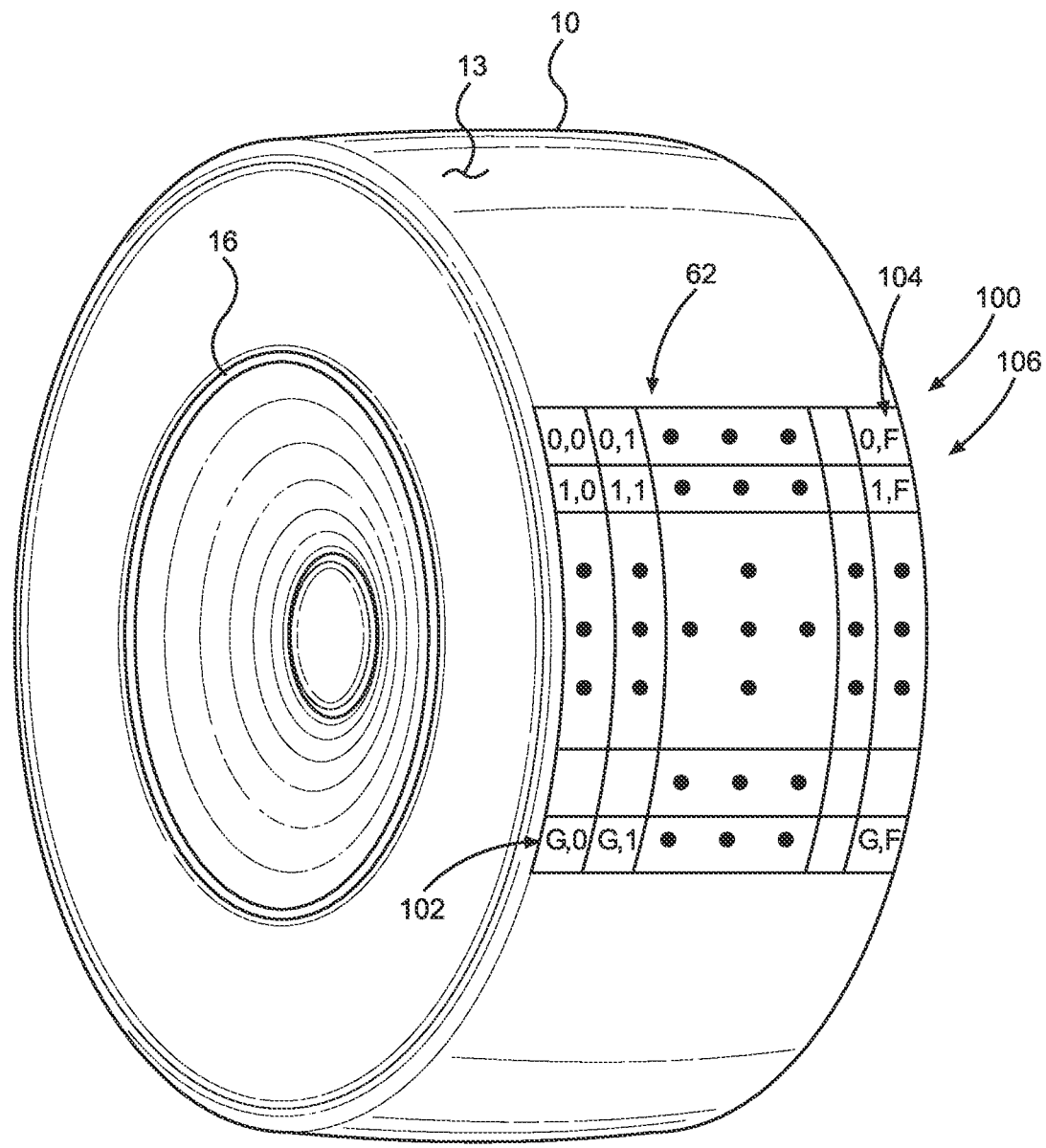
FIG. 10 is a diagram of the data structure for the reference frame or the subsequent frame physically relates to a section of the tire.

The tire defect detection system uses thermal (e.g., infrared) imaging and the analysis of thermal images to detect defects in the tire. An infrared camera is used to capture a thermal image, also referred to herein as a frame, of a section of the tire. The area of the frame, and hence the field-of-view of the infrared camera, is divided into rows and columns of pixels (e.g., data). Each pixel of the field-of-view falls on a respective portion of the section of the tire, as best seen in FIG. 10. When the infrared camera captures the thermal image of the section, each pixel of the frame captures (e.g., senses, records) the temperature of its corresponding portion of the section of the tire. For example, the field-of-view of the infrared camera may have 1024 pixels across and 512 pixels down for a total of 524,288 pixels. Each pixel relates to a specific portion (e.g., one of 524,288 distinct portions) of the section of the tire, so the value of each pixel in a frame represents the temperature of that specific portion of the section of the tire.

The system is adapted to detect defects that result in a loss of air (e.g., gas) from the tire. As air from inside the tire exits a defect, it expands and reduces the temperature (e.g., cools) the area of the tire around the defect. The system includes one or more infrared cameras that capture a series of frames of the section of the tire. The system compares an earlier captured frame (e.g., the reference frame) to a later captured frame (e.g., the subsequent frame) to determine whether a portion of the section of the tire has decreased in temperature. The reference frame is captured when the tire is in a globally stable thermal state. The tire may be in a stable thermal state when the tire is completely deflated or just after inflation of the tire. If a portion of the tire has cooled, the reduction in temperature is an indication that a defect exists in that portion of the section. Further, since the pixels of the frames relate to respective portions of the section of the tire, the pixels that show the reduction in temperature relate to the location of the defect in the section of the tire. In other words, analysis of frame data identifies the physical location of the defect in the section of the tire.

The tire defect detection system may create and store records relating to the inspection of the tire and the defects found in the tire. The information created and stored may include frame data, thermal images, photographic descriptions, written descriptions and the results of analyzing some or all of the data captured by the system, and in particular the reference frame and the subsequent frame. The creation and storing of records may be fully automated.

The pixels of a frame may be presented as an image on a display. The cooler parts of the section of the tire, and therefore the defects, may be easily visible in the image.

The system may be implemented in various embodiments that range from a fully automated system that requires no user participation except to load and unload the tire from the system to a system that requires the user to position the tire and the infrared camera. Example embodiment of various systems are provided herein. The system may use a variety of techniques to analyze the thermal images to detect defects. Example techniques are provided herein.

B. Some Possible Components of a System

Figure 1:
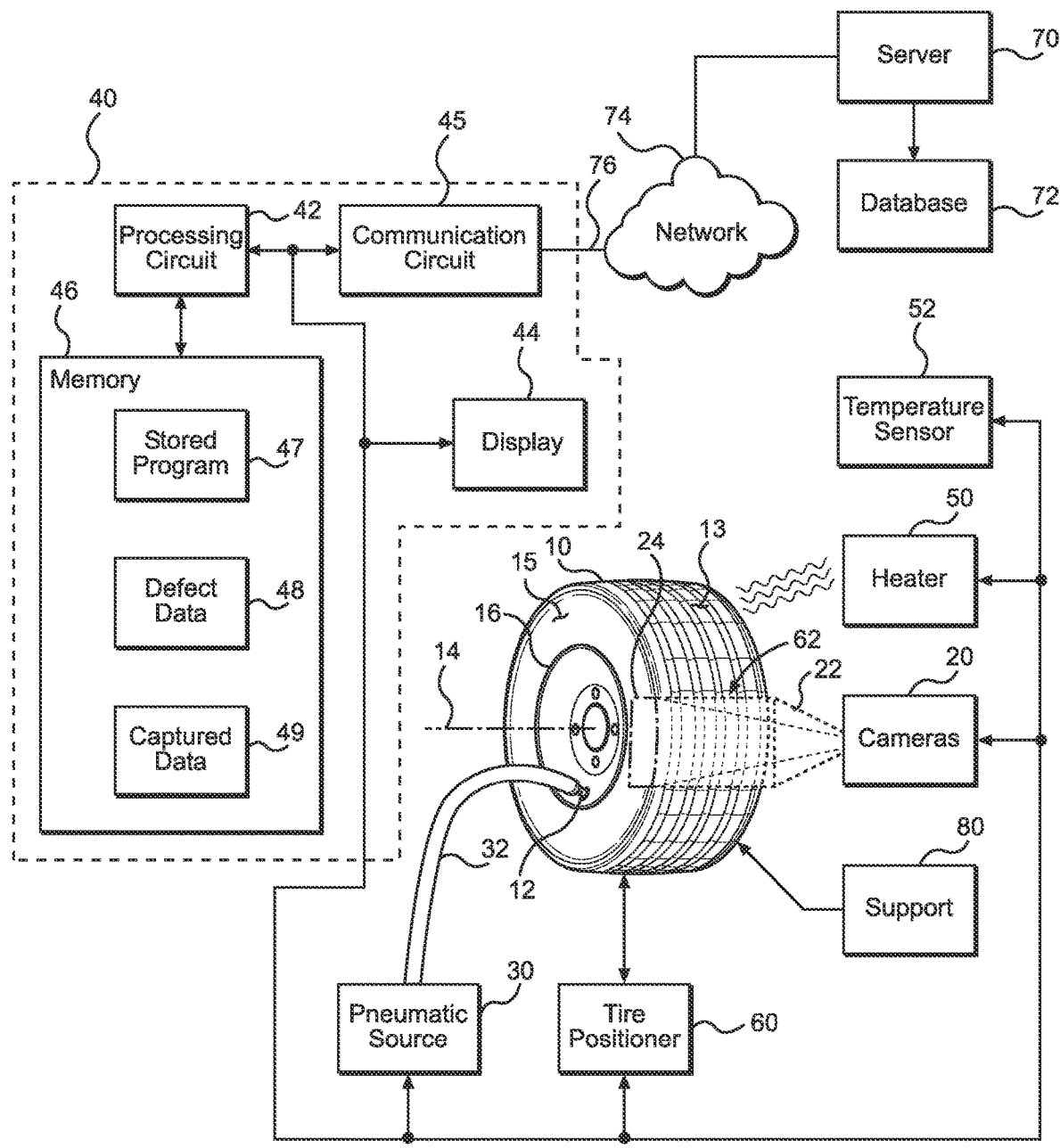
FIG. 1 is a block diagram of a tire defect detection system, according to various aspects of the present disclosure.

Prior to discussing example embodiments of the tire defect detection system, it is instructive to identify the various component that may be part of an embodiment. As best shown in FIG. 1, an embodiment of the system for inspecting the tire may include a support 80, one or more infrared cameras 20, a pneumatic source 30, a computing device 40, a heat source 50, a temperature sensor 52, a tire positioner 60 and a server 70. An example embodiment may use a network 74 to accomplish communication between the computing device 40 and the server 70.

Some embodiments of the system will include more of the above components than other embodiments of the system. However, all embodiments of the system include one or more infrared cameras 20, the pneumatic source 30 and the computing device 40, or at least the processing circuit 42 of the computing device 40. The component discussed above are described in further detail below.

The term tire refers to the rubber portion of tire alone and/or the tire while mounted on a tire rim. The inspection of the tire occurs primarily on the rubber portion of the tire alone since that is the most likely place for a defect to occur. However, the valve stem 12 of the tire 10 is positioned on the rim of the tire 10 and may also be the source of a leak of air, so the rim, or a portion thereof, in particular the valve stem 12, may also be inspected to detect a defect.

C. Sections of a Tire

The term "section of the tire" as used herein refers to a portion of the tire 10. The section 62 of the tire 10 includes the sidewall 15 (e.g., front, back, portion in field-of-view 24) of the tire or the tread 13 (e.g., portion within field-of-view 22) of the tire 10. Since the tire 10 is circular in shape, the sidewalls 15 or the tread 13 of the tire 10 extend around a 360-degree arc. The term "section" refers to any portion of the 360-degree circumference of the tire 10.

Figure 2:
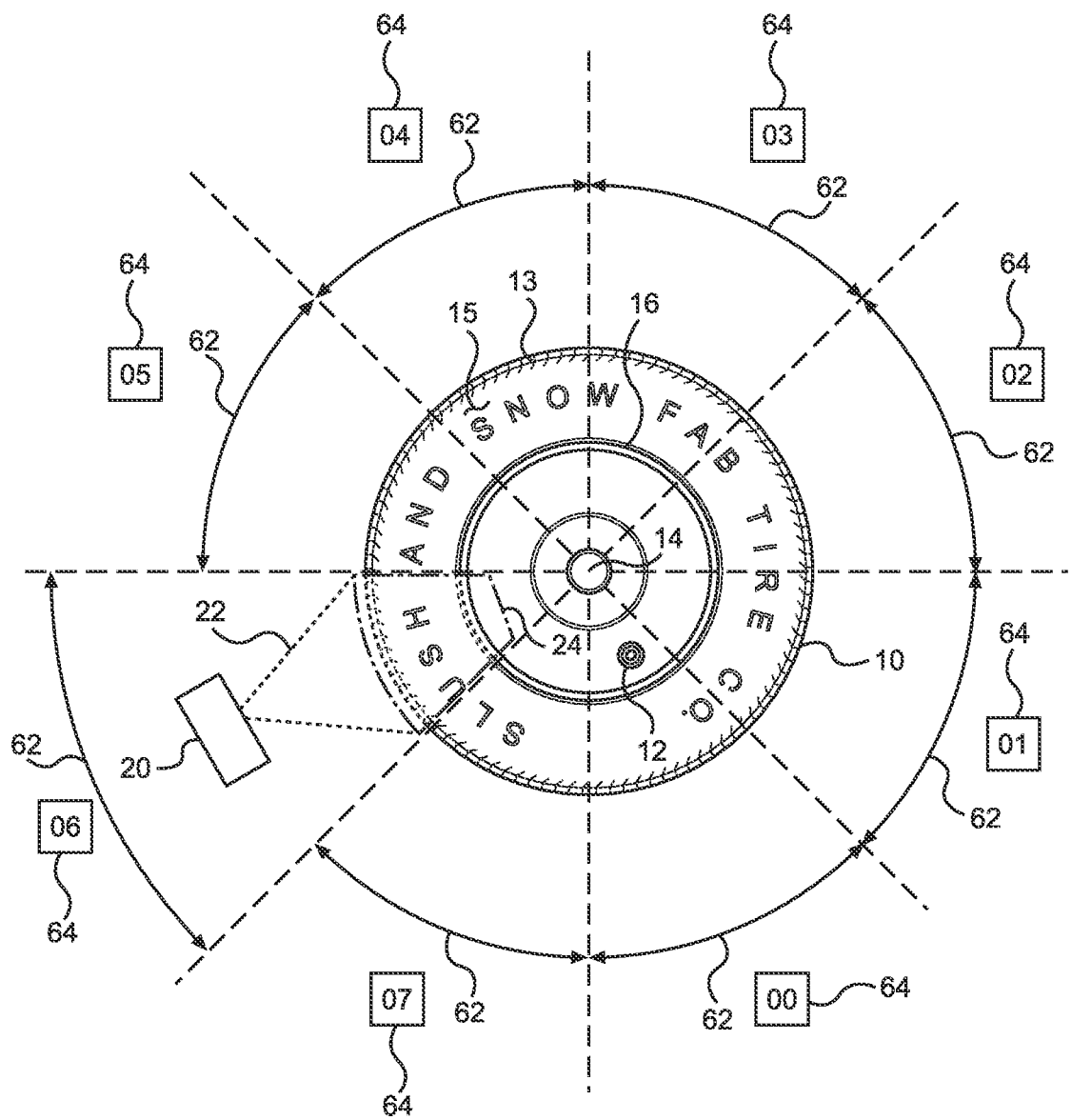
FIG. 2 is a top view of the sections of the tire.

An example embodiment of the sections 62 of the tire 10 is shown in FIG. 2. The tire 10 shown in FIG. 2 is divided into eight sections 62, so each section 62 is a 45-degree portion of the circumference of the tire 10. Generally, the size of the section 62 corresponds to the size of the field-of-view (e.g., 22, 24) of the infrared camera 20. For example, as shown in FIG. 2, the field-of-view 22 and 24 of the infrared camera 20 covers a 45-degree section of the circumference of the tread 13 or the sidewall 15 of the tire 10. In another example, the field-of-view 22 and 24 of the infrared camera 20 covers a 36-degree portion of the circumference of the tire 10, so the section 62 of the tire 10 is 1/10 of the circumference of the tire, which means that the tire is divided into ten sections 62.

One issue that arises with respect to the sections 62 is accurately identifying the sections 62 after removal of the tire 10 from the test system. Further, during inspection of the tire, data is captured for one or more sections 62 of the tire 10. After testing, there needs to be away to correlate the captured data to the physical section of the tire 10. One example method to accurately identify the sections 62 of the tire 10, is to identify an origin section and location of the other sections with respect to the origin section.

The origin section of the tire 10 may be identified in a variety of ways. For example, the origin section of the tire 10 may be specified as the section that contains the valve stem 12 at the center of the section. Information regarding the origin section may be stored as origin indicia 65. In another example, the origin section may be described with respect to the writing on the sidewall 15 of the tire 10. For example, the letter "C" from "CO." of the phrase "SLUSH AND SNOW FAB TIRE CO" may be used to identify the origin section. The origin indicia 65 may include a written description that identifies the letter "C." as appearing in a specific portion (e.g., edge) of the section. The origin indicia 65 may include a photograph of the sidewall of the section showing the position of the letter "C." with respect to the boundaries of the section.

All of the sections 62 of the tire 10, including the origin section, may be identified using a section indicia 64. For example, as shown in FIG. 2, the origin section is assigned the section number 00, the next section 62 is assigned the section number 01, the next section 62 is assigned the number 02, and so forth. Information may be stored that describes the direction of rotation 67 to move from one section 62 to another section 62. For example, to go from the section 62 identified as 00 to the section 62 identified as 01, the tire is rotated in the clockwise direction. The origin indicia 65, the section indicia 64 for each section, the direction of rotation 67 may be stored in captured data 49.

The origin indicia 65, the section indicia 64 and the direction of rotation 67 may be used as follows. Assume that the tire 10 is inspected and defects are identified. Assume that all captured and calculated data are stored in captured data 49 and/or defect data 48. Further assume the tire is sent to the manufacturer for failure analysis. The manufacture may use the origin indicia 65 to accurately identify the origin section of the tire 10. The manufacturer may use the section indicia 64 and the direction of rotation 67 to rotate the tire from the origin section to any section 62 that has a defect 164. The origin indicia 65, the section indicia 64 and the direction of rotation 67 make it easy to identify the physical portion of the tire to which the captured data 49 and/or the defect data 48 relates.

Finding or establishing an origin section may be omitted if the user manually marks the defect identified as the section-under-test (e.g., section within field-of-view) before moving to the next section for inspection. Manually marking may include using some form of marking pen to draw a circle around the defect. The section may be presented on the display 44 so that the user may see the location of the defect in the section-under-test, so the user may mark the defect.

D. The Physics of Thermal Defect Detection

The tire 10, when it is without defects, retains air (e.g., gas) inside at a certain pressure (e.g., pounds per square inch, PSI). The pressure of the air inside the tire is greater than the atmospheric pressure, so when the tire 10 develops a defect 164 (e.g., hole, puncture, flaw), the air inside the tire exits the tire through the defect 164. The rate at which the air exits the flaw depends on the size and type of the defect 164. A large diameter puncture with clean edges allows the air to escape quickly and at a high rate thereby deflating the tire 10 quickly. A small diameter puncture with overlapping edges that obstruct the puncture or a flaw between the layers of the tire 10 inhibits the escape of air so the air escapes more slowly and at a lower rate.

As the air exits the defect 164 in the tire 10, the air expands because it is leaving an area of higher pressure (e.g., inside the tire) and entering an area of lower pressure (e.g., the atmosphere). As the escaping air expands, its temperature decreases. The decrease in the temperature of the air as it exits the tire 10 via the defect 164 decreases the temperature of (e.g., cools) the tire 10 in the area of the defect 164. The escaping air decreases the temperature of a portion of the tire 10 around the defect 164 and not the tire 10 as a whole.

Figure 17:
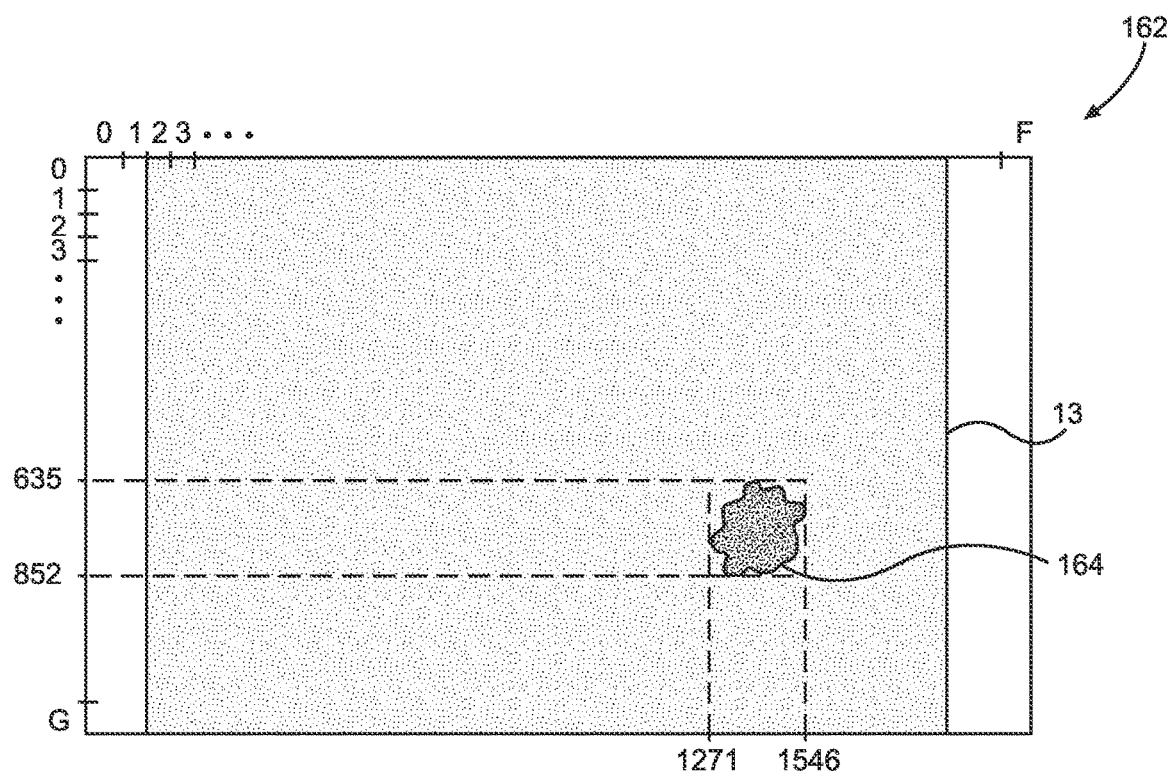
FIG. 17 is a diagram of an example image of the subsequent frame that includes a defect.

From the perspective of the field-of-view of the infrared camera 20, the field-of-view (e.g., 22, 24) covers a section 62 of the tire 10. As best shown in FIG. 17, the escaping air from a defect 164 located in the section cools the portion (e.g., row 635 and column 1271 to row 852 and column 1546, (635, 1271) to (852, 1546)) of the section around the defect 164, and not the section as a whole (e.g., (0,0) to (G, F)). So, the area of the tire 10 that is cooled by the air escaping from the defect 164 is limited to the portion of the section 62 that is proximate to (e.g., around) the defect 164. The localized cooling of the tire 10 due to the escape of air from the defect 164 enables the infrared camera 20 to detect a change of temperature in a portion (e.g., (635, 1271) to (852, 1546)) of the section 62 and thereby identify the defect 164 in that section 62 of the tire 10. In other words, the decrease in the temperature of the portion of the section 62 occurs as a result of a flow of air out of the tire through the defect 164 thereby cooling the portion of the section 62.

E. Support

The support 80 is adapted to support the tire 10. The support 80 may support the weight of the tire 10 in whole or in part. The support 80 cooperates with the tire positioner 60 to position (e.g., manipulate, rotate) the tire 10. The support 80 may include a tire spindle (e.g., post) 82 that is positioned (e.g., inserted) through the center of the rim of the tire 10 to support the weight of the tire 10 and to permit the tire 10 to be rotated around the central axis 14 of the tire spindle 82. The support 80 may also include a component spindle 84 for supporting components of the inspection system. The support 80 may further include a base 86 for stabilizing and supporting the support 80 and the component of the system.

Figure 5:
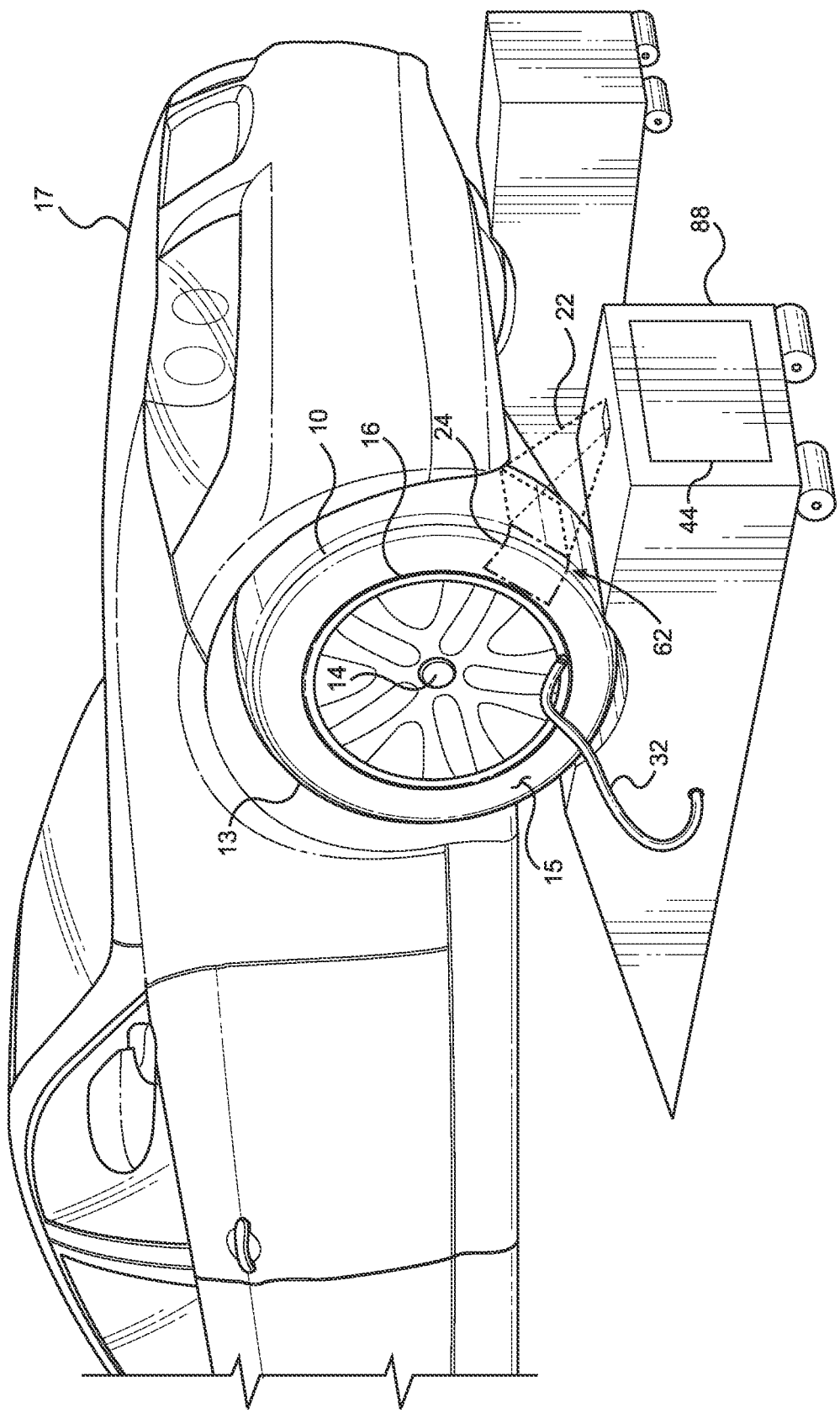
FIG. 5 is a perspective view of a third example embodiment of the tire defect detection system.

In another example embodiment, as best shown in FIG. 5, ramp support 88 is shaped in part like a ramp to allow the vehicle 17 to drive the tire 10 onto the ramp support 88 for inspection. The ramp support 88 may support the weight of the tire 10 and a part of the weight of the vehicle 17 because the tire 10 remains attached to the vehicle 17 during examination.

F. Pneumatic Source

The pneumatic source 30 is adapted to inflate the tire 10. As best seen in FIGS. 3-6, The pneumatic source 30 may include a hose 32. The hose 32 is adapted to connect to the valve stem 12 of the tire 10, so the pneumatic source 30 inflates the tire 10 via the hose 32. In an example embodiment, the computing device 40 controls the operation of the pneumatic source 30 to inflate the tire 10. In another example embodiment, as best seen in FIG. 4, the pneumatic source 30 is operated manually by a user to inflate the tire 10. In an example embodiment, the pneumatic source 30 inflates the tire 10 to a pre-determined pressure. In an example embodiment, the pneumatic source 30 inflates the tire 10 to the recommended pressure (e.g., 30 PSI) for the tire 10. The pneumatic source 30 may include any type of air compressor. The hose 32 may connect to the valve stem 12 in any manner. The hose 32 may connect to a device (e.g., pneumatic collar 36) that delivers air to the valve stem 12 of the tire 10 while the tire 10 rotates.

The computing device 40, and in particular a processing circuit 42 of the computing device 40, may be adapted to control the pneumatic source 30. The processing circuit 42 may be adapted to control the pneumatic source 30 responsive to executing a stored program. The processing circuit 42 may instruct the pneumatic source 30 to provide air to (e.g., inflate) the tire 10. The processing circuit 42 may instruct the pneumatic source 30 to cease providing air to the tire 10. The processing circuit 42 may receive information regarding the pressure of the tire 10, so the processing circuit 42 may cease providing air to the tire 10 when the tire 10 reaches a predetermined pressure.

The pneumatic source 30 may measure (e.g., detect) a pressure of the air in the tire 10. The pneumatic source 30 may report the pressure of the air in the tire 10 to the processing circuit 42. The processing circuit 42 may instruct the pneumatic source 30 cease providing air to the tire 10 when the tire 10 reaches a predetermined pressure.

G. Tire Positioner

The tire positioner 60 is adapted to position the tire 10. The tire positioner 60 is adapted to position one section 62 of the tire 10 in the field-of-view (e.g., 22, 24) of the infrared camera 20. The tire positioner 60 may successively position each section 62 of the tire 10 in in the field-of-view of the infrared camera 20.

The tire positioner 60 may identify each section 62 of the tire 10. The tire positioner 60 may uniquely identify each section 62 of the tire 10. The data used to identify the section 62 of the tire 10 is referred to as the section indicia (e.g., identifier) 64. The section indicia may be used to identify the section 62 of the tire 10 presently positioned in the field-of-view (e.g., 22, 24) of the infrared camera 20. The tire positioner 60 may report the section indicia 64. The section indicia 64 may be recorded (e.g., stored). The section indicia 64 may be associated with the data (e.g., frames) captured with respect to the section 62. In an example embodiment, a rotary encoder 68 is used to identify each section 62 of the tire 10. The section indicia 64 may be related to an origin section of the tire 10.

The tire positioner 60 may identify one section 62 of the tire 10 as being an origin section. The origin section of the tire 10 is one section 62 that may be used to reference the other sections 62 of the tire 10. Information regarding the origin section may be recorded, so the origin section, and hence all other sections, may be identified after testing is complete. For example, as discussed above, the origin section of the tire 10 may be the section of the tire 10 that includes the valve stem 12 at a specific location (e.g., left edge, right edge, middle) in the section 62. The origin section of the tire 10 may be the section 62 that includes the tire specification information printed on a sidewall of the tire 10 at a specific location in the section 62. A photograph, not thermal, of the sidewall 15 of the origin section may be captured to later identify the origin section. The photograph may be stored along with any other data (e.g., captured data 49) associated with the tire 10.

For example, assume that during inspection the tire 10, the origin section of the tire is identified as the section in which the valve stem 12 is in the center of the section 62. Each section 62 is ⅛ of the circumference of the tire 10, such that each section 62 is a 45-degree portion of the circumference of the tire 10. Further, during inspection a rotary encoder 68 is used to provide section indicia 64 for each of the sections 62. The section indicia 64 for the origin section is the number 00, the section indicia 64 for the next section, as the tire 10 rotates clockwise from the origin section, is 01, the section indicia 64 for the next section 62 in a clockwise direction is 02, and so forth. Assume that the information needed to identify the origin section, the section size, and the section identifier for all of the sections is recorded along with the frames captured during the inspection of the tire 10. Assume that during inspection, the defect 164 is identified in section 04 and that the tire is returned to the manufacturer for failure analysis.

Upon receipt of the tire, the manufacture may use information regarding the origin section of the tire 10 to position the tire 10 on a support with the origin section positioned in the field-of-view of the infrared camera 20. Having identified the origin section, the manufacturer may use the section indicia 64 of the location of the defect 164 (e.g., section 04) to rotate the tire to where the defect 164 is located. Now that the section 62 of the defect 164 has been properly identified, the manufacturer may begin further analysis of the defect 164. Lacking information regarding the origin section of the tire 10, the manufacturer could not accurately and quickly identify the section 62 where the defect 164 is located.

In an example embodiment, the tire positioner 60 automatically locates and/or identifies the origin section. An example embodiment the tire positioner 60 automatically rotates the tire 10 from one section 62 to any other section 62. The tire positioner 60 may provide data regarding the sections 62 of the tire 10 for storing with and relating to other data captured and/or calculated with respect to the sections 62 of the tire 10.

The computing device 40, and in particular a processing circuit 42 of the computing device 40, may be adapted to control the tire positioner 60. The processing circuit 42 may be adapted to control the tire positioner 60 responsive to executing a stored program. The processing circuit 42 may instruct the tire positioner 60 to position a section 62 of the tire 10 in the field-of-view (e.g., 22, 24) of the infrared camera 20.

The tire positioner 60 may be integrated with the support 80. The tire positioner 60 may be integrated with any type of equipment used to maintain tires. For example, the tire positioner 60 may be integrated with a tired jack and a tire changer machine, a tire balancing machine and a tire clamping machine.

H. Heat Source

The tire defect detection system may further include a heat source 50 adapted to heat the tire 10. The heat source 50 may heat the tire 10 prior to and/or while inflating the tire 10. Heating the tire 10 accentuates the decrease in the temperature that results from an escape of air from the defect 164 in the tire 10. Heating the tire 10 makes it easier to identify defects 164 in the tire 10 because it increases the difference in temperature between the portion of the section 62 cooled by the escaping air and the remainder of the section 62 of the tire 10.

The heat source 50 may heat the tire 10 in any method. The heat source 50 may heat by conduction, convection and/or radiation. The heat source 50 may include an infrared heater. The heat source 50 may include a space heater.

Another approach for accentuating the decrease in the temperature that results from the escape of the gas from the defect 164 is to inflate the tire 10 with a gas whose temperature is less, possibly significantly less, than the temperature of the tire. The cooler initial temperature of the gas in combination with the cooling caused by the expansion of the gas as it escapes through the defect 164 will cause an increased temperature difference between the area around the defect 164 and the remainder of the tire 10. When using a cooled gas, the reference frame may be captured while the tire 10 is deflated or immediately after the tire 10 is inflated before the temperature of the gas can begin to cool the tire 10.

In an example embodiment, the heat source 50 heats the tire 10 prior to the infrared camera 20 capturing the reference frame 100. In an example embodiment, the heat source 50 heats the tire 10 while pneumatic source 30 inflates the tire 10. In another example embodiment, the heat source 50 heats the tire 10 while the tire is deflated. In an example embodiment, the heat source 50 heats only the section 62 of the tire positioned in the field-of-view (e.g., 22, 24) of the infrared camera 20. In another example embodiment, the heat source 50 heats the entire tire.

The computing device 40, and in particular a processing circuit 42 of the computing device 40, may be adapted to control the heat source 50. The processing circuit 42 may be adapted to control the heat source 50 responsive to executing a stored program. The processing circuit 42 may instruct the heat source 50 to begin heating the tire 10. The processing circuit 42 may instruct the heat source 50 to cease heating the tire 10.

I. Temperature Sensor

The tire defect detecting system may include the temperature sensor 52. The temperature sensor 52 may detect the temperature of the tire 10 in general. The temperature sensor 52 is not used to detect the respective temperatures of the various portions of the section 62 of the tire 10, as is performed by the infrared camera 20. The temperature sensor 52 may cooperate with the processing circuit 42 and the heat source 50 to detect the temperature of the tire 10, so the heat source 50 may continue heating or cease heating the tire 10.

J. Cameras

The tire defect detecting system includes one or more infrared cameras 20. As discussed above the infrared camera 20 includes a field-of-view. When the field-of-view of the infrared camera 20 is positioned over the tread 13, the field-of-view is referred to as the field-of-view 22, whereas, when the field-of-view is positioned over the sidewall 15, is referred to as field-of-view 24. The infrared camera 20 may be positioned over the tread 13 to capture frame data (e.g., reference frame 100, subsequent frame 106) within the field-of-view 22 then repositioned over the sidewall 15 to capture frame data within the field-of-view 24 or a first infrared camera 20 may be positioned to capture frame data for field-of-view 22 and a second infrared camera 20 positioned to capture frame data for the field-of-view 24.

The infrared camera 20 captures temperature data regarding the section 62 of the tire 10 within the field-of-view (e.g., 22, 24) by sensing the temperature of the section 62 of the tire 10. As discussed above, the infrared camera 20 captures a frame of data in which each pixel of the frame represents the temperature of a respective portion of the section of the tire 10.

As discussed above, the frame data captured by the infrared camera 20 is used to detect a decrease in the temperature of a portion of the section 62 of the tire 10 that results from an escape of air through a defect 164 in the tire 10. Detecting a decrease in temperature implies detecting a first temperature and a second temperature then determining whether the temperature has changed (e.g., increased, decreased, remain the same).

In accordance with detecting a change in temperature, the infrared camera 20 captures a reference frame 100 of the section 62 of the tire 10. The reference frame 100 may be captured while the tire 10 is deflated or it may be captured after the tire 10 has been inflated. The reference frame 100 may be captured immediately after the tire 10 has been inflated. A period of time after inflation, the infrared camera 20 captures a subsequent frame 106, or a plurality of subsequent frames 106, of the section 62 of the tire 10. The period of time may be in the range of seconds to minutes depending on the rate at which the air is escaping through the defect 164. As discussed herein in further detail, the subsequent frame 106 may be compared to the reference frame 100 to detect the change in temperature, and thereby whether a defect 164 exists in that section 62 of the tire 10.

In an example embodiment, the infrared camera 20 captures the reference frame 100 and a plurality of subsequent frame 106. Each subsequent frame 106 is captured the period of time after capture of the previous subsequent frame 106. Each subsequent frame 106 is compared to (e.g., subtracted from) the reference frame 100 to determine the difference between the subsequent frame 106 and the reference frame 100. The difference between the subsequent frame 106 and the reference frame 100 may be determined (e.g., calculated) by subtracting the subsequent frame 106 from the reference frame 100. Any type of subtraction (e.g., pixel-wise, cluster, column-wise, row-wise, run-length encoded) may be performed to determine the difference. The result of finding the difference between the subsequent frame 106 and the reference frame 100 may be stored as a difference frame 108. The subsequent frame 106 that has the greatest difference with the reference frame 100 is used as the subsequent frame 106 for detecting defects 164. The other subsequent frames 106 of the plurality may be discarded or recorded as part of the test record.

When the infrared camera 20 captures the reference frame 100 or the subsequent frame 106, the value of each pixel represents the temperature of the corresponding portion of the section 62, as shown in FIG. 10, at the time of capture. The value of each pixel of the reference frame 100 represents the temperature of the respective areas of the section 62 after inflation and before cooling due to defects 164. The value of each pixel of the subsequent frame 106 represents the temperature of the respective areas of the section 62 of the tire 10 after a period of time. The subsequent frame 106 may be compared to the reference frame 100 to detect the area of the section 62 that has cooled and therefore the physical location of the defect 164 in the section 62. In other words, because the pixels of the reference frame 100 and the subsequent frame 106 correspond to respective portions of the section 62 of the tire 10, comparing the reference frame 100 to the subsequent frame 106 identifies the location of the portion within the section 62 where the decrease in the temperature occurs, thereby identifying the location of the defect 164.

K. Captured Data

The data captured or determined by the tire defect detecting system, herein referred to as captured data 49, may be stored. Data may be captured and/or determined by any component of the tire defect detecting system. Data may be captured and/or determined for each section of the tire 10.

For example, captured data 49 may include the tire identifier 11, the origin indicia 65, the number of sections 63, the direction of rotation 67, and the section record 90. The tire identifier 11 may include a serial number. The serial number may include the DOT serial number found on tires made in the United States. The tire identifier 11 may include a written or photographic description of the tire 10.

The origin indicia 65 includes information that describes the origin section of the tire 10. As discussed above, the origin section is the section of the tire used to reference the other section of the tire. The origin indicia 65 may include a standard feature of the tire (e.g., valve stem 12), a written description and/or a photograph of the origin section.

The number of sections 63 stores the number of sections into which the tire 10 was divided for inspection. The data for each section 62 is stored in a respective section record 90, so the number of records identified as section record 90 corresponds to the number of sections 63. The number of sections 63 may be a number that is used to divide the circumference of the tire to identify the size of each section. The number of sections 63 may be identified by identifying the number of degrees of a complete circle used for each section. For example, storing the number eight for the number of sections 63 provides information that the tire 10 was divided into eight sections for inspection and that each section is 45 degrees of the circumference of the tire. Storing the number 10 degrees for the number of sections 63 provides the information that each section of the tire 10 is 10 degrees of the circumference of the tire which means that there are 36 sections for the tire 10.

The direction of rotation 67 identifies the direction (e.g., counterclockwise, clockwise) that the tire 10 was rotated from the origin section to the next section 62 when the sections exceed two are considered in order. The origin indicia 65, the number of section 63 and the direction of rotation 67 make it possible to positively identify and to accurately position each section 62 of the tire 10 after initial inspection of the tire 10.

Section record 90 includes the section indicia 64, the reference frame 100 and the subsequent frame 106. As discussed above, the infrared camera 20 may capture a plurality of subsequent frames, so the subsequent frame 106 of the section record 90 may include the plurality of subsequent frames 106. The section record 90 may further include the difference frame 108 (not shown).

The reference frame 100, the subsequent frame 106 and/or the difference frame 108 may be used to identify defects in the section 62 of the tire 10 during examination or after examination. Captured data 49 may be transmitted (e.g., sent) to a server 70.

L. Computing Device

In an example embodiment, the tire defect detection system includes the computing device 40. The computing device 40, and thereby the tire defect detection system, includes a processing circuit 42, a display 44, a communication circuit 45 and a memory 46. The computing device 40 may include the display 44. The memory 46 is adapted to store data. For example, the memory 46 is adapted to store at least one of a stored program 47, the defect data 48 and the captured data 49. The processing circuit 42 is adapted to control the memory 46. In particular, the processing circuit 42 is adapted to store data in and to retrieve data from the memory 46.

Any device capable of performing the functions of the computing device 40 may be the embodiment of the computing device 40. In an example embodiment of the tire defect detection system, a smart phone 41 is the embodiment of the computing device 40. In another example embodiment, a tablet is the embodiment of the computing device 40. In another example embodiment, a mobile computer is the embodiment of the computing device 40.

The communication circuit 45 is adapted to transmit or receive data. In an example embodiment, the processing circuit 42 is adapted to control the communication circuit 45. The processing circuit 42 is adapted to retrieve data from the memory 46 and to provide the data to the communication circuit 45 for transmission. The processing circuit 42 is adapted to receive data from the communication circuit 45 and to store the data in the memory 46. In an example embodiment, the communication circuit 45 transmits at least one of the defect data 48 and the captured data 49, which includes the reference frame 100 and the subsequent frame 106 for the respective section record 90, so the communication circuit 45 transmits at least one of the reference frame 100 and the subsequent frame 106.

M. Network, Server, Database

The tire defect detection system may include network 74, server 70, and database 72. The computing device 40 may communicate (e.g., transmit to, received from) with the server 70 via the network 74. The computing device 40 may communicate with the network 74 using communication link 76. Communication link 76 may be a wired and/or a wireless communication link.

In an embodiment, the communication circuit 45 of the computing device 40 transmits at least one of a defect data 48, including the reference frame 100 and the subsequent frame 106 for one or more sections 62 of the tire 10 to the server 70. The server 70 stores at least one of the defect data 48, the reference frame 100 and the subsequent frame 106 for one or more sections 62 of the tire 10 in the database 72.

The server 70 may use the captured data 49 to determine whether any section 62 of the tire 10 has a defect 164. The server 70 may analyze the captured data 49 to determine whether any section of the tire 10 has a defect 164 after, including long after, the inspection of the tire 10 has been completed. The server 70 may store the captured data 49 in the database 72. The server 70 may store multiple versions of the captured data 49 for the same tire 10 in the database 72. The captured data 49 may include a date (e.g., date and time, date stamp) that the inspection was performed and the captured data 49 captured.

The database 72 may maintain a historical record of the inspections of the tire 10. The database 72 may include the captured data 49 captured during each inspection of the tire 10. The various captured data 49 may be distinguished by a timestamp.

N. Identifying Defects

The tire defect detection system may use the data captured by the infrared camera 20 to determine whether a defect 164 exists in a section 62 of the tire 10. As discussed above, the defect 164 is detected in the section the two of the tire 10 by detecting a decrease in the temperature of a portion of the section 62 of the tire 10. A variety of techniques may be used to detect whether a defect exists in the section 62 of the tire 10.

In an example embodiment, the system (e.g., processing circuit 42, server 70) compares the reference frame 100 to the subsequent frame 106 to detect a decrease in the temperature of a portion of the section. The decrease in the temperature occurs during the period of time between capture of the reference frame 100 and capture of the subsequent frame 106. The decrease in the temperature of the portion of the section indicates a defect. In example embodiment, comparing the reference frame 100 to the subsequent frame 106 comprises subtracting the subsequent frame 106 from the reference frame 100 to form a difference frame 108, as discussed above. The difference frame 108 is then analyzed to determine whether any defects 164 exist in the section 62.

Subtracting may be accomplished by subtracting the value of each pixel of the subsequent frame 106 from the value of the corresponding pixel in the reference frame 100 and storing the result of subtracting in the corresponding pixel of the difference frame 108. For example, the value of the pixel (e.g., value (0,0) stored in row 0, column 0 (e.g., (0,0)) of the subsequent frame 106 is subtracted from the value (0,0) of the reference frame and the result is stored as value (0,0) in the difference frame 108, the value (0,1) of the subsequent frame 106 is subtracted from the value (0, 1) of the reference frame 100 and stored as the value (0, 1) in the difference frame 108, and so forth. Subtracting the corresponding pixels values is referred to herein as pixel-wise subtraction. Pixel-wise subtraction may produce a difference frame 108 whose pixel values are zero or close to zero for most pixels except for those pixels in the area (e.g., portion) of the section 62 where the temperature is dropping and the defect 164 is located. Prior to subtraction, the values of the pixels of any frame may be transformed (e.g., multiplied by a factor, added to a base value, subtracted from a base value, squared, divided by of factor, any function, any combination thereof) prior to subtraction.

Subtracting may also the accomplished by combining proximate pixels in the reference frame and the subsequent frame into respective groups and subtracting the value of the groups from each other. For example, the values of four proximate pixels (e.g., (0,0), (0, 1), (1, 0), (1, 1)) may be combined (e.g., averaged, subtracted, added, squared, cubed, any function, any combination thereof) in the reference frame 100 and/or the subsequent frame 106 prior to subtracting. The four proximate pixels may be assigned the combined value for pixel-wise subtraction or the group value for the pixels of the subsequent frame 106 may be subtracted from the group value of the reference frame 100. The resulting values may be stored in the difference frame 108.

Analysis or further analysis may be performed on the difference frame 108, the reference frame 100, the subsequent frame 106 or any combination thereof to determine the presence of a defect 164 in the section 62. In an example embodiment, blob detection techniques are used to analyze the difference frame 108 to identify defects. In another example embodiment, blob detection techniques are used to analyze the subsequent frame 106 to identify defects. In an embodiment that captures a plurality of subsequent frames 106, blob detection techniques may be used to analyze one or more subsequent frames of the plurality, alone or in combination, to identify defects 164.

Blob detection includes any technique that detects (e.g., identifies) regions in a digital image (e.g., reference frame 100, subsequent frame 106, difference frame 108) that differ in properties. Properties may include brightness, color or in this case temperature. Blob detection compares the properties of one region (e.g., one or more pixels) of the image to surrounding regions of the image. A blob is a region (e.g., one or more adjacent pixels) in which one or more properties are the same or approximately the same. Blob detection may detect adjacent pixels (e.g., first region) that have similar properties then compare the properties of the first region to the properties of surrounding regions. In this case a group of pixels that have approximately the same temperature may be compared to other groups of pixels to determine whether there is a difference in temperature between the groups.

The most common method used for blob detection is convolution. The property of interest (e.g., temperature) in image may be expressed as a function of its position in the image. The function may then be convoluted with another function (e.g., a different temperature-to-position function) to identify areas (e.g., blobs) of the image that have common properties. Blob detection techniques may be used to identify areas that have experienced a decrease in temperature, and are therefore likely defects 164, and the location of the defect 164 in the section the two of the tire 10.

Blob detection techniques may also include differential methods based on derivatives of a function with respect to position and/or local extrema methods based on finding local maxima and/or minima of the function. Once a blob (e.g., region) is identified, the region may be further processed to identify objects in the region. Blob extraction techniques used to identify objects in the blob may include connected-component labeling and connecting-component analysis.

Edge detector techniques and corner detector techniques may be used to identify the characteristics of the blob. Blob extraction techniques may be used to identify a type (e.g., puncture, gash, layer flaw) of the defect 164, the severity (e.g., depth, width, height, area) of the defect 164.

In an example embodiment, comparing the reference frame 100 to the subsequent frame 106 to detect a decrease in the temperature of the portion of the section 62 includes subtracting the subsequent frame 106 from the reference frame 100 to form the difference frame 108 and analyzing the difference frame 108 using blob detection techniques to identify the portion (e.g., area) of the section 62 that experienced the decrease in the temperature. In another example embodiment, comparing the reference frame 100 to the subsequent frame 106 includes using blob detection techniques to identify a location of the defect 164. In another embodiment, comparing the reference frame 100 to the subsequent frame 106 includes using blob detection techniques to identify at least one of a type of the defect 164 and a severity of the defect 164. In another example embodiment, the processing circuit 42 compares the reference frame 100 to the subsequent frame 106 using blob detection techniques to detect the decrease in the temperature of the portion of the section 62 thereby detecting the defect 164. In another example embodiment, the processing circuit 42 compares the reference frame 100 to the subsequent frame 106 by subtracting the subsequent frame 106 from the reference frame 100 to form a difference frame 108 and analyzing the difference frame 108 using blob detection techniques to identify the portion of the section 62 that experienced the decrease in the temperature.

Other analysis techniques for identifying defects in a section 62 may include histogram analysis, texture analysis, feature identification techniques used in the field of computer vision. Feature identification techniques include edge detection, corner detection, interest point detection, region detection, ridge detection, edge direction detection, changing intensity detection, autocorrelation, motion detection, template matching and Hough transforms.

O. Defect Data

Once a defect 164 has been identified, information regarding the defect 164 may be stored in defect data 48. The defect data 48 is a record of all the defects identified in a specific tire 10. The defect data 48 for different tires will be different. The defect data 48 may include a date to identify the date on which the tire 10 was inspected to find the defects 164 that are recorded in the defect data 48. A specific tire 10 may have multiple defect data 48 with different dates.

In an example embodiment, defect data 48 includes the tire identifier 11, the origin indicia 65, the number of sections 63, the direction of rotation 67, the number of rows in the frame 102 (e.g., reference frame 100, subsequent frame 106, difference frame 108), the number of columns in the frame 104, and one or more defect records 110.

As discussed above with respect to the captured data 49, the tire identifier 11, the origin indicia 65, the number of sections 63 and the direction of rotation 67 may be used to positively identify and to accurately position each section 62 of the tire 10 after the initial inspection of the tire 10. The number of rows in the frame 102 and the number of columns in the frame 104 identify the number of rows and columns in the frame data (e.g., reference frame 100, subsequent frame 106, difference frame 108) used to identify the defect 164, so that the location of the defect 164 in the section 62 may be accurately located and identified.

The defect record 110 includes section indicia 64, the row number 116, the column number 118 and the area 119. The section indicia 64, as discussed above, identifies the section 62 of the tire 10 where the defect 164 is located. The row number 116 and column number 118 identify the row and column of the location of the defect with respect to the frame, and thereby the physical location of the defect 164 in the section indicia 64. The row and column numbers may refer to any portion of the defect (e.g., top, bottom, center). In an example embodiment, the row number 116 and column number 118 identify the pixel at the center of, or close to the center of the defect. The area 119 describes the area covered by the defect or the area covered by the defect 164 and the area of decreased temperature of the tire 10 around the defect 164. The area 119 may be described by the coordinates (e.g., (row number, column number)) of the corners of a geometric shape (e.g., square, rectangle) that encloses the defect and/or the area of decreased temperature of the tire 10. The area 119 may be described by the coordinates of the edges around the defect. The area 119 may be described in any manner that uses one or more coordinates to describe an area.

The defect data 48 may be used to accurately identify the location of a defect in the tire 10, so that the location of the defect may be found once again after the initial inspection has been completed, and possibly the tire shipped to another facility for further analysis and work.

P. Display

The tire defect detection system may include a display 44. The display may be a part of the computing device 40. The display 44 may be a part of the server 70. The display 44 may be standalone, but receive data for presentation from the computing device 40 and/or the server 70. The display 44 may be positioned in the support (e.g., 80, 88). The frames (e.g., reference frame 100, subsequent frame 106, difference frame 108) captured by the infrared camera 20 are infrared images of the tire. Being images, the frames may be presented on the display 44 for viewing by a user.

Figure 16:
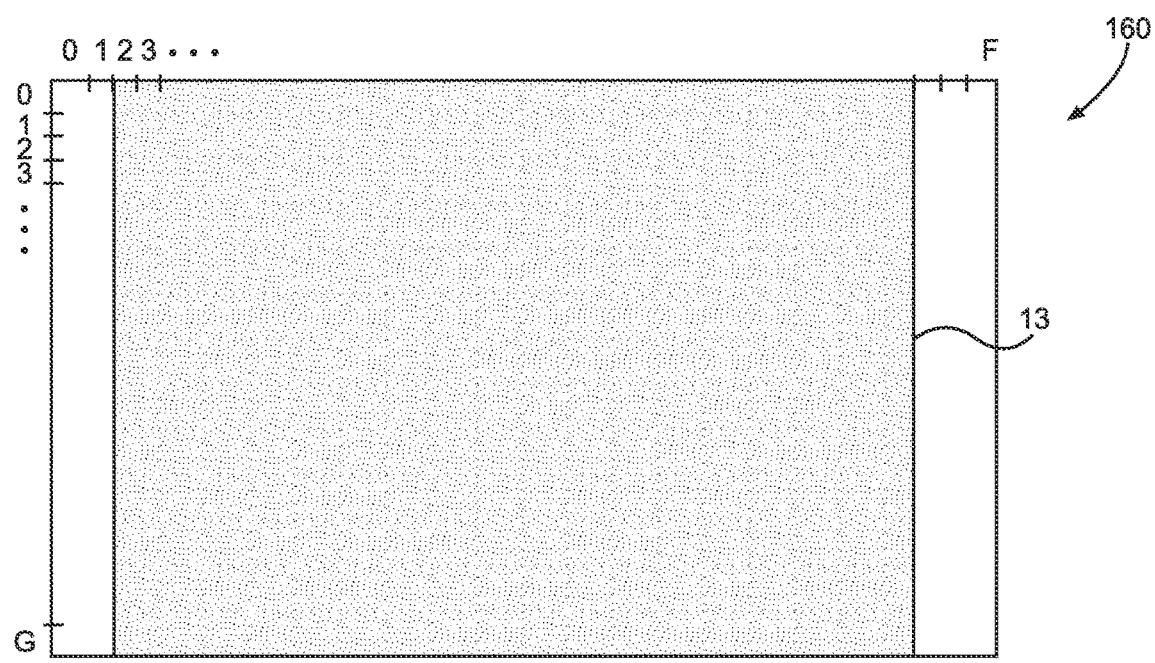
FIG. 16 is a diagram of an example image of the reference frame.
Figure 18:
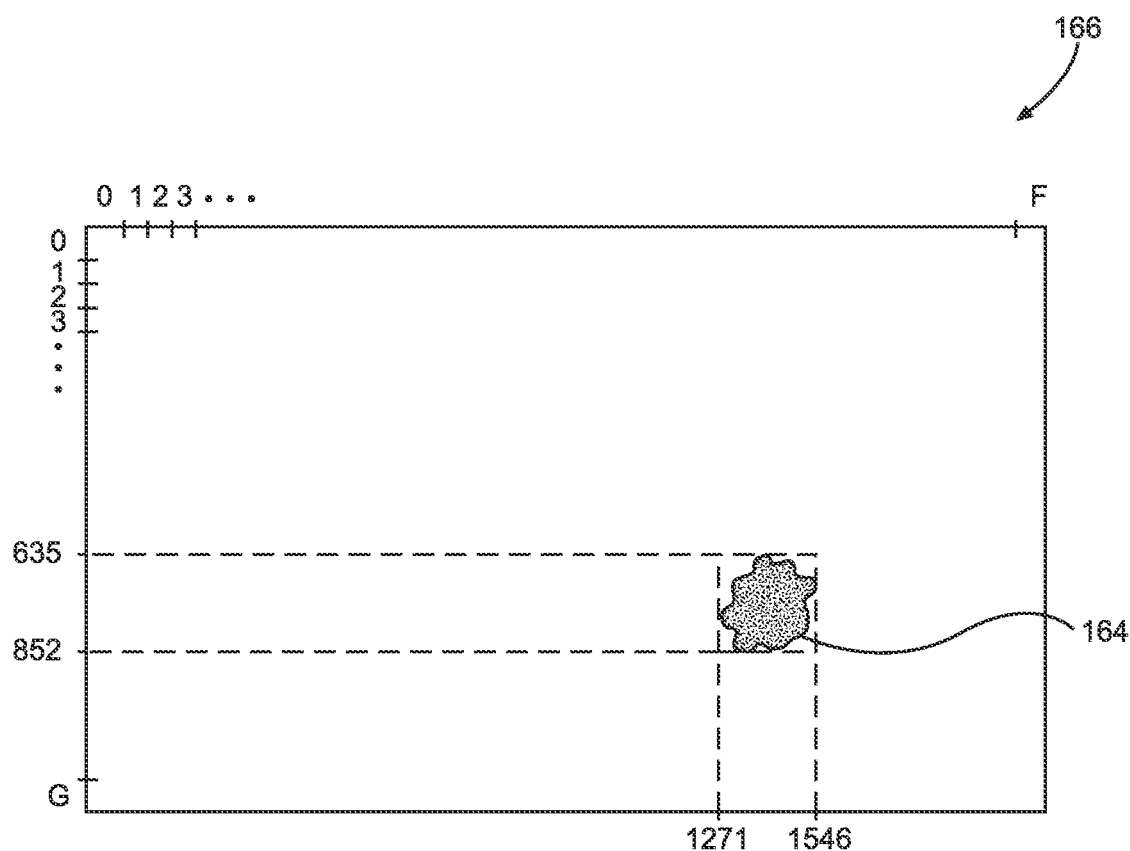
FIG. 18 is a diagram of an example image of the difference frame that includes the defect.

In an example implementation, the system for inspecting the tire includes the display 44, the display 44 is adapted to present the reference frame 100, the subsequent frame 106, and/or the difference frame 108 as an image, whereby the defect 164 is visible in the image. For example, referring to FIGS. 16-18, the display 44 may be adapted to display the reference frame 100 as the reference image 160, the subsequent frame 106 as the subsequent image 162, and the difference frame 108 as difference image 166. Because the reference frame 100 is captured shortly or immediately after inflating the tire 10, the reference image 160 shows the temperature of the section 62 of the tread 13 of the tire 10 as being substantially the same across the reference image 160. After a period of time, air has escaped through defect 164 thereby cooling the area of the tread 13 of the tire 10 around the defect 164, so the subsequent image 162 shows an increased difference in the temperature between the area around the defect and the rest of the section 62.

Figure 15:
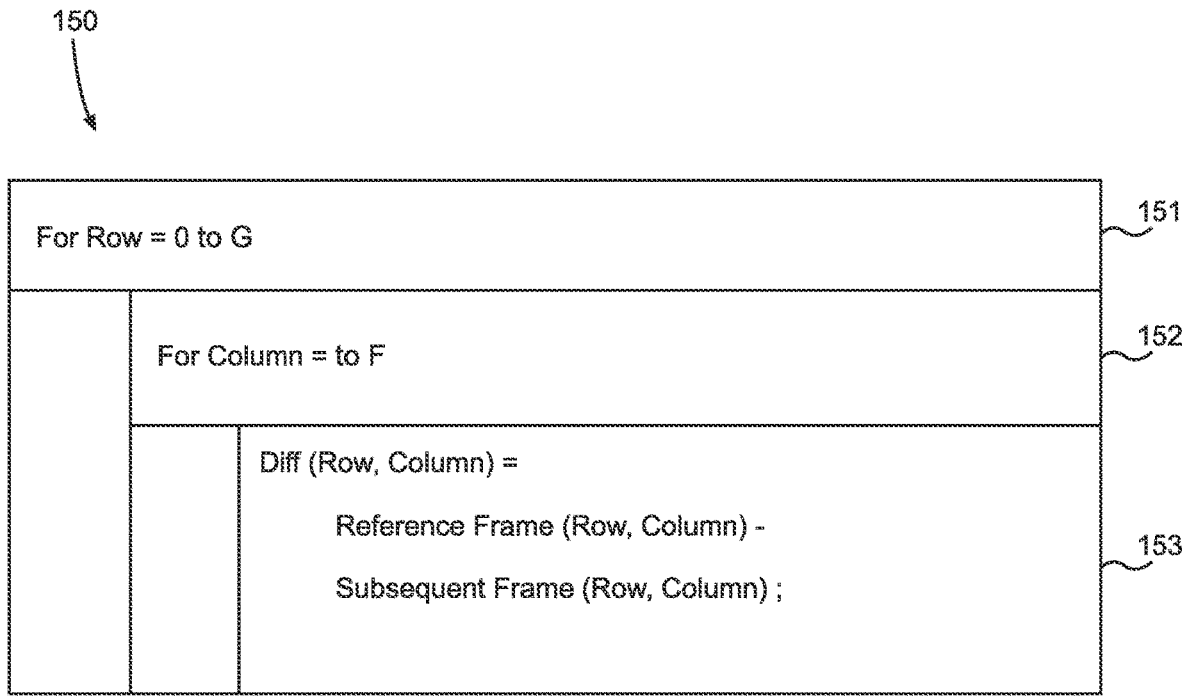
FIG. 15 is an example embodiment of pseudocode for subtracting the subsequent frame from the reference frame.

The display 44 may also be adapted to present the difference frame 108 or any other type of frame after analysis has been performed to identify the defect 164. For example, FIG. 17 shows the presentation of the difference image 166 on the display 44. In this example, the difference frame 108 was created by subtracting the subsequent frame 106 from the reference frame 100. Since the temperature of the tread 13 in both the reference frame 100 in the subsequent frame 106 are essentially the same across much of the section 62, subtracting the subsequent frame 106 from the reference frame 100 results in no color or little color for most of the pixels of the difference frame 108. However, the color of the area in and around the defect 164, where the temperature difference is the greatest, are visible or more pronounced. In FIG. 17, the areas of little or no color are shown as being white whereas the areas of more pronounced color (e.g., defect 164) are shown as being darker in color. The colors may be reversed so that the areas of little or no color are dark (e.g., black, gray) while the areas of more pronounced color are lighter in color (e.g., white). The colors of FIGS. 15-17 were selected for clarity of presentation. The defect 164 may be visible in the presentation of the subsequent image 162 and may be even more visible in the presentation of the difference image 166.

Figure 9:
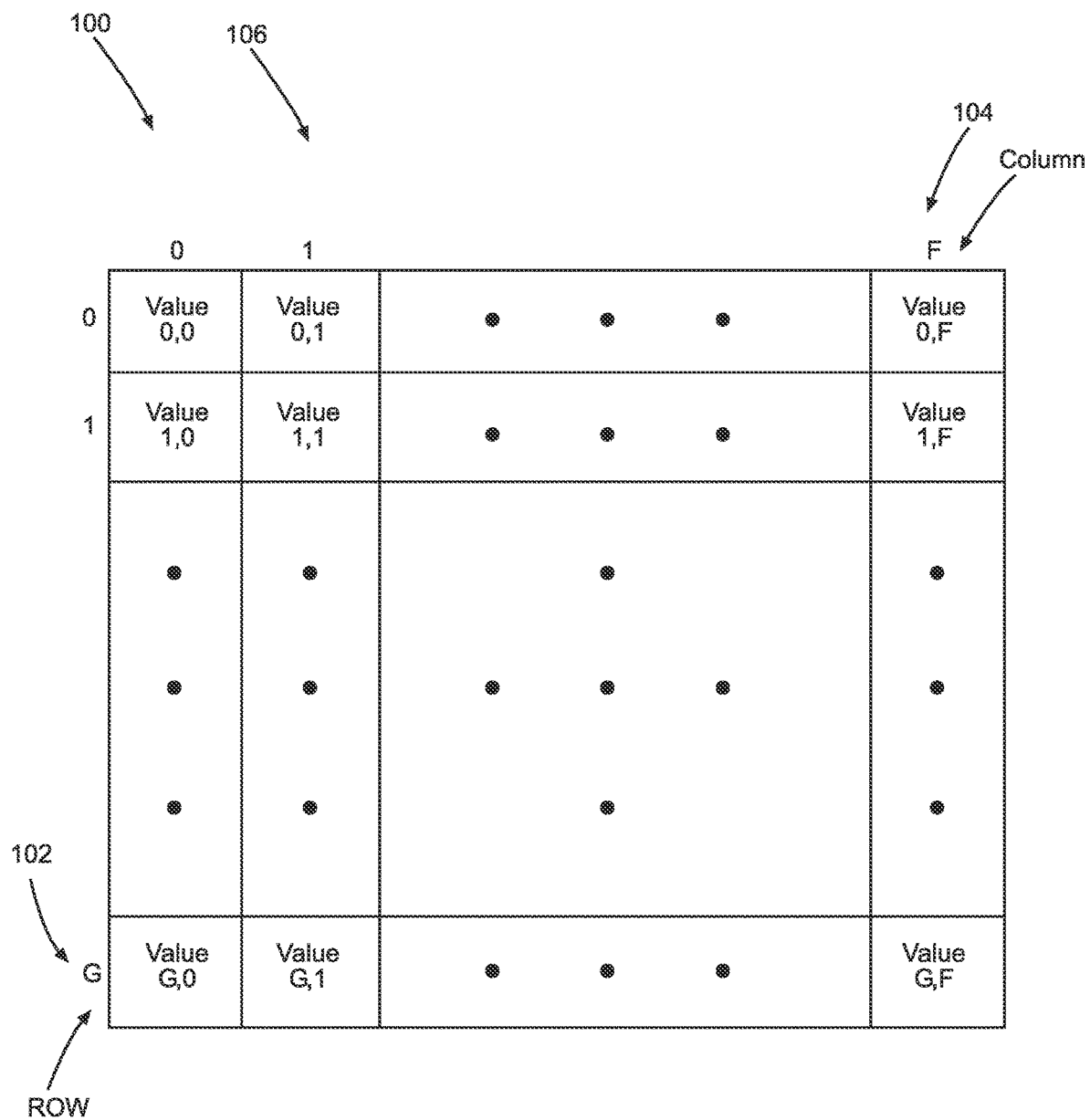
FIG. 9 is a diagram of an example data structure for the infrared data captured in the reference frame or the subsequent frame.
Figure 11:
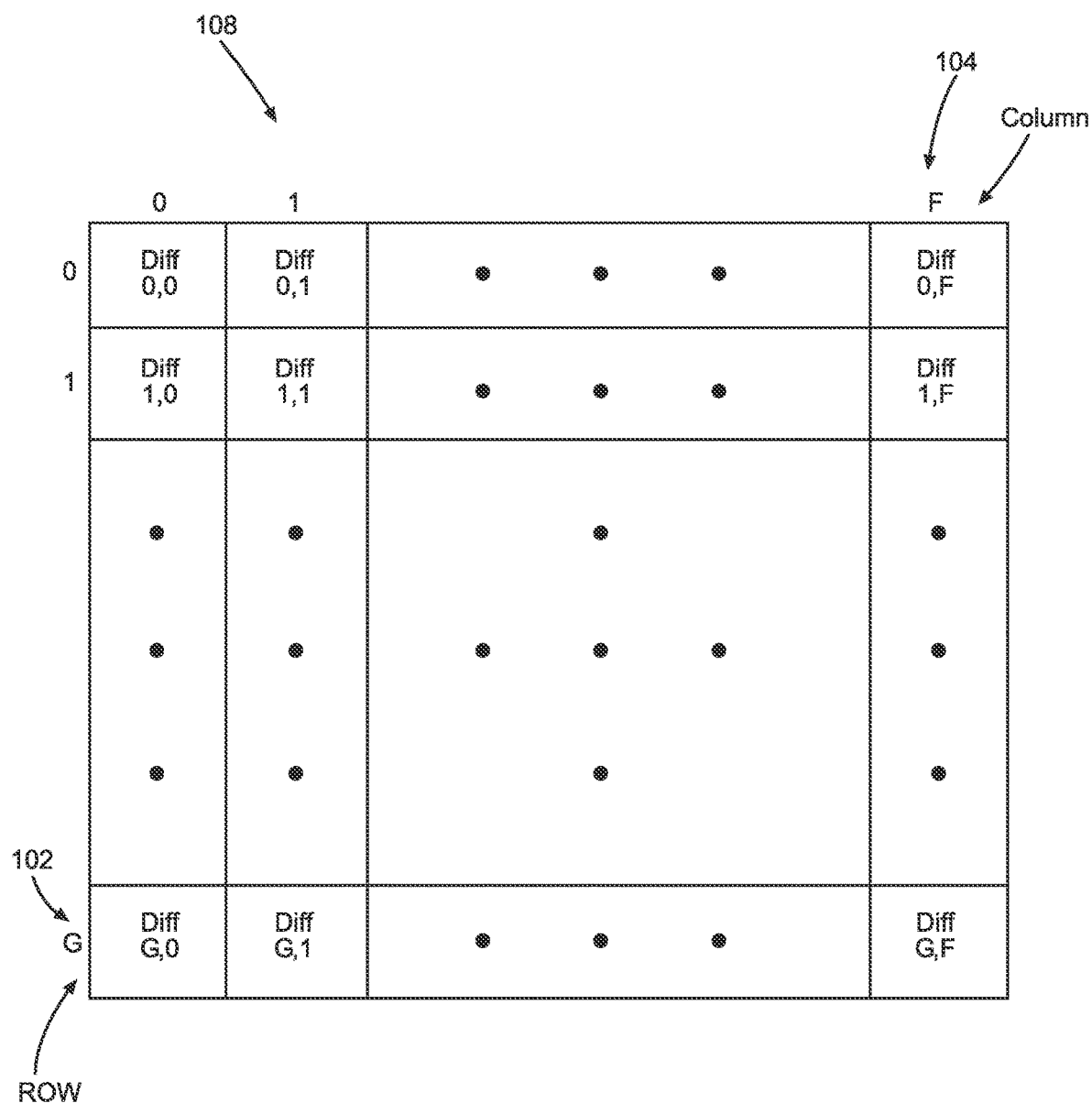
FIG. 11 is a diagram of an example data structure for the data of a difference frame.

The processing circuit 42 of the computing device 40 or the server 70 may be adapted to control the display 44. The processing circuit 42 or the server 70 may provide the data to the display 44 for presentation. The display 44 may present additional information in addition to the reference image 160, the subsequent image 162 and/or the difference image 166. For example, the display 44 may present the defect data 48 and/or the captured data 49 for viewing by a user. The display 44 may further present information as to the status of an ongoing inspection, such as the total number of sections, the number of sections inspected, the number sections to be inspected, the number of defects found or other such information. The display 44 may further display the values of the pixels of a frame (e.g., value (0,0), value (0,1), value (0,2), and so forth, diff (0,0), diff (0,1), diff (0,2), and so forth), as best shown in FIGS. 9-11, as opposed to the color represented by the value of the pixel.

Q. First Example Embodiment

An embodiment of the tire inspection system may include some, but not all, of the components discussed above. Because some, but not all, of the component may be used in the system, there are many embodiments of the system. Some, but not all, of the possible embodiments are described herein.

Figure 3:
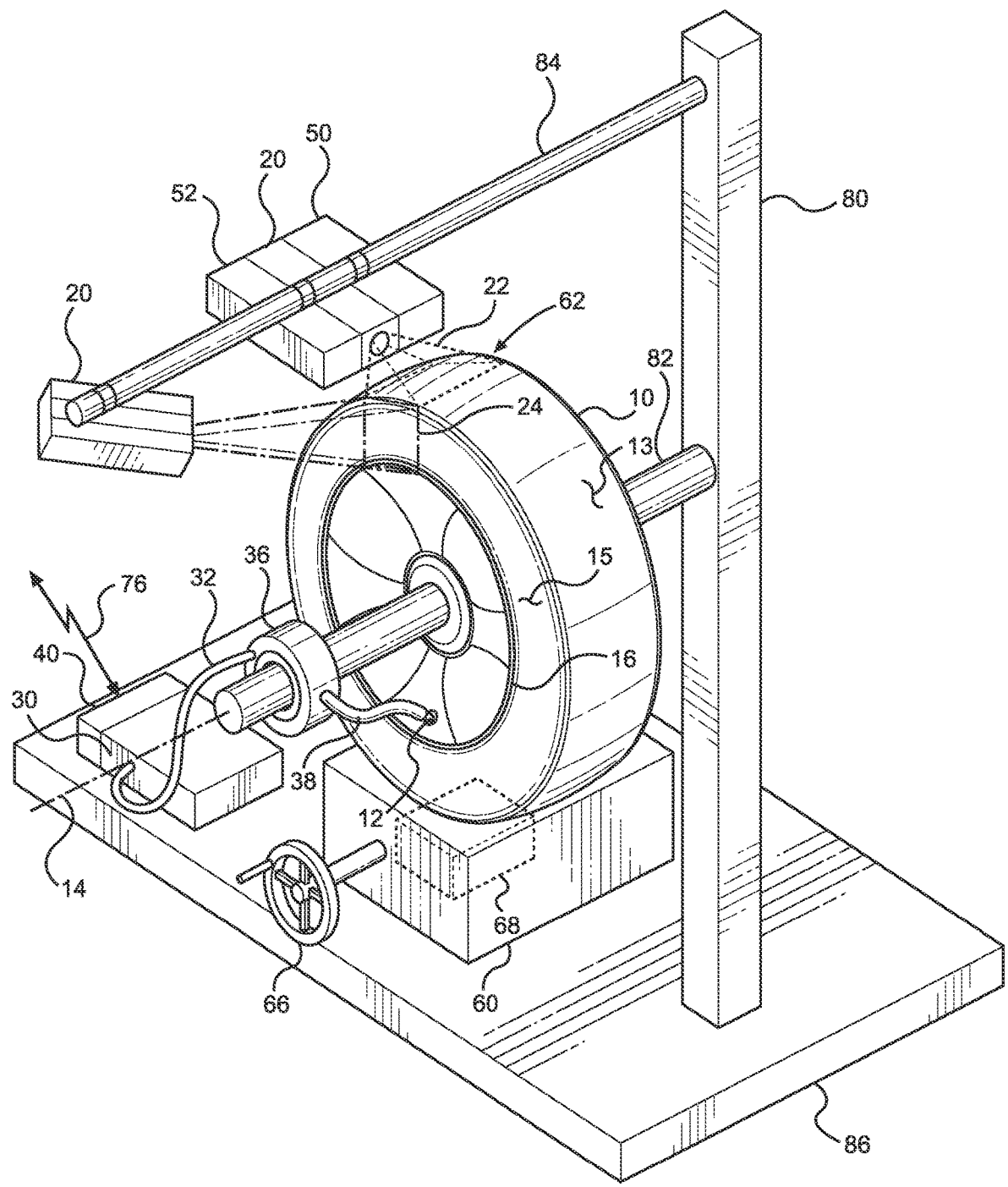
FIG. 3 is a perspective view of a first example embodiment of the tire defect detection system.
Figure 4:
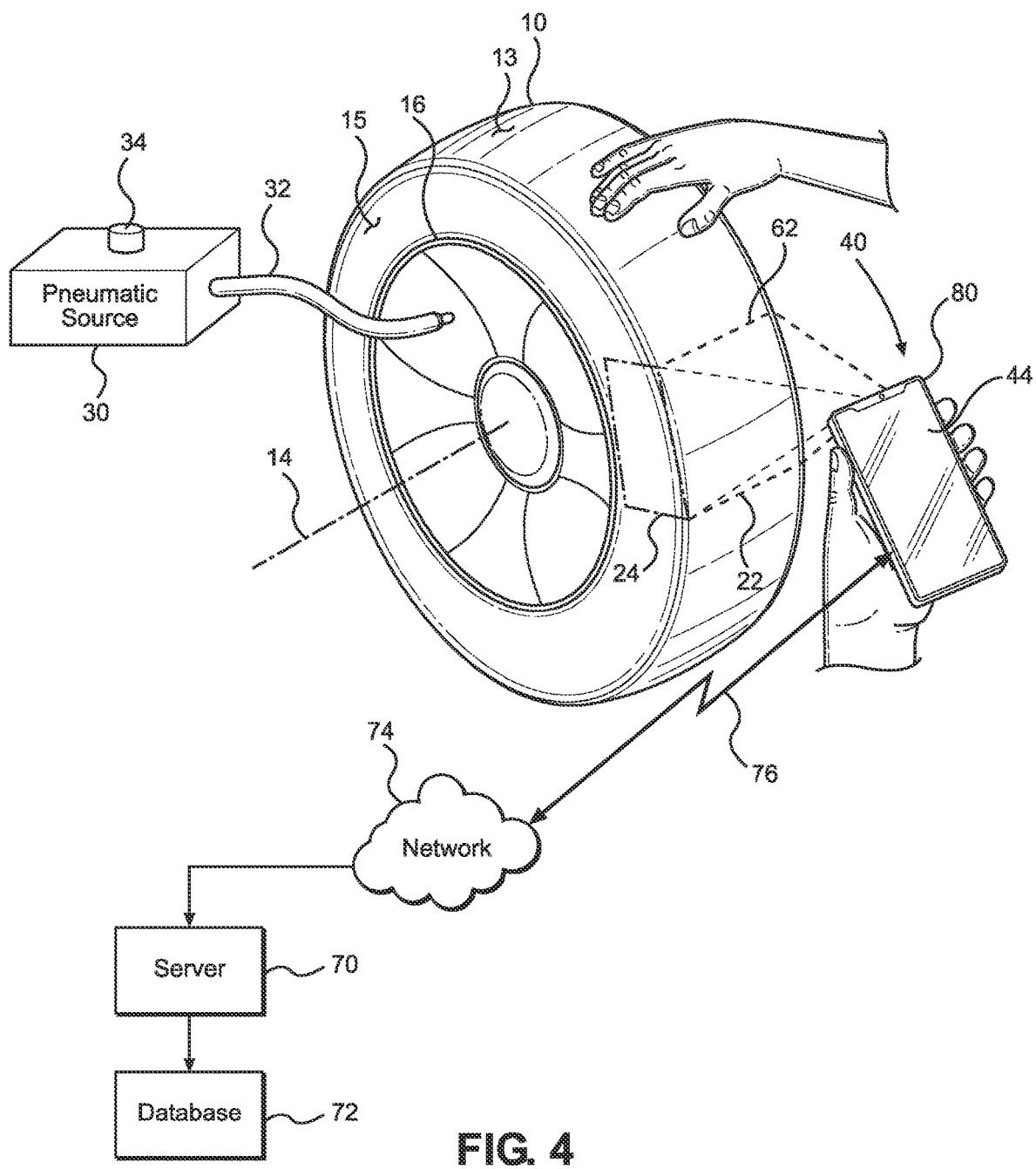
FIG. 4 is a perspective view of a second example embodiment of the tire defect detection system.

In a first example embodiment, as best seen in FIG. 3, the system for inspecting the tire 10 includes the support 80, the tire positioner 60, the pneumatic source 30, the first infrared camera 20 for capturing frames of the tread 13 (e.g., in field-of-view 22) of the tire 10, the second infrared camera 20 for capturing frames of the sidewall 15 (e.g., in field-of-view 24) of the tire 10, the heat source 50, the temperature sensor 52 and the computing device 40.

The support 80 includes the tire spindle 82, the component spindle 84 and the base 86. The tire spindle 82 is adapted to be positioned through the center of the rim 16 of the tire 10. The tire spindle 82 supports the weight of the tire 10 so that the tire 10 may be rotate around the central axis 14 of the tire spindle 82. The component spindle 84 is adapted to support the first infrared camera 20, the second infrared camera 20, the heat source 50, and the temperature sensor 52. The first infrared camera 20, the second infrared camera 20, the heat source 50, and the temperature sensor 52 are coupled to the component spindle so that they are oriented toward the tire 10.

The tire positioner 60 is adapted to position the tread 13 of the section 62 in the field-of-view 22 of the first infrared camera 20 and the sidewall of the section 62 in the field-of-view 24 of the second infrared camera 20. The tire positioner 60 is adapted to position the tire 10 by rotating the tire 10. The tire positioner 60 includes the manual control 66 and the rotary encoder 68. The tire positioner 60 may automatically position the tire 10 without user intervention or a user may operate manual control 66 to position the tire 10.

The rotary encoder 68 is adapted to identify the sections 62 of the tire 10. One section 62 of the tire 10 may be designated as the origin section as discussed above. Information regarding the origin section and the information from the rotary encoder 68 are used to accurately identify and position each section 62 of the tire 10. The information regarding the origin section of the tire 10 and the sections of the tire 10 as identified by the rotary encoder 68 may be stored in the captured data 49.

The pneumatic source 30 includes pneumatic collar 36, hose 32 and hose 38. The pneumatic source 30 is adapted to provide air to the tire 10 to inflate the tire 10 via the hose 32, the pneumatic collar 36 and the hose 38. The inner portion of the pneumatic collar 36 couples to the tire spindle 82. Hose 32 connects the pneumatic source 30 to the inner portion of the pneumatic collar 36. The hose 38 connects the outer portion of the pneumatic collar 36 to the valve stem 12 of the tire 10. The inner portion of the pneumatic collar 36 does not rotate with respect to the tire spindle 82, so the position and orientation of the hose 32 does not change as the tire 10 rotates between sections 62. The outer portion of the pneumatic collar 36 rotates with respect to the tire spindle 82, so that as the tire 10 rotates between sections 62, the outer portion of the pneumatic collar 36 and hose 38 rotate with the tire. The pneumatic collar 36 keeps the hose 32 and the hose 38 from becoming tangled as the tire 10 rotates. The pneumatic source 30 delivers air to the inner portion of the pneumatic collar 36 via hose 32. The inner portion of the pneumatic collar 36 delivers air to the outer portion of the pneumatic collar 36, which in turn delivers air to the tire 10 via the hose 38 to inflate the tire 10.

The computing device 40 includes the processing circuit 42, the memory 46, the communication circuit 45 and the display 44. The memory 46 stores the stored program 47, the defect data 48 and the captured data 49. The processing circuit 42 may execute the stored program 47 to control the components of the first embodiment to inspect the tire 10. The processing circuit 42 may store the data generated during the inspection in the memory 46 as the captured data 49. The processing circuit 42 may display the captured data 49 on display 44. The processing circuit 42 may transmit the captured data 49 to another device via the communication circuit 45.

For each section of the tire 10, the first infrared camera 20 captures a reference frame 100 and one or more subsequent frames 106 of the tread 13 of the tire 10. For each section of the tire 10, the second infrared camera 20 captures a reference frame 100 and one or more subsequent frames 106 of the sidewall 15 of the tire 10. The reference frames 100 and subsequent frames 106 captured by the first infrared camera 20 and the second infrared camera 20 are stored in the captured data 49.

The heat source 50 heats the section 62 of the tire 10 that is within the field-of-view 22 and/or the field-of-view 24. The heat source 50 heats the section 62 while the tire 10 is been inflated by the pneumatic source 30. After the tire 10 has been inflated, the heat source 50 ceases to heat the section 62.

The temperature sensor 52 senses the temperature of the section 62 of the tire 10 that is within the field-of-view 22 and/or the field-of-view 24. The temperature sensor 52 measures the temperature to which the tire 10 is been heated by the heat source 50. The temperature measured by the temperature sensor 52 may be reported to the processing circuit 42. The temperature measured by the temperature sensor 52 may be stored in the captured data 49.

Once the first infrared camera 20 and/or the second infrared camera 20 have captured the reference frame 100 and one or more subsequent frames 106 for one or more of the sections 62 of the tire 10, the processing circuit 42 may compare the reference frame 100 and the one or more subsequent frames 106 for one section 62 to each other to determine whether a portion of the section 62 has decreased in temperature. Any of the comparison techniques discussed above may be used to compare the reference frame 100 to the one or more subsequent frames 106. The data generated and the data regarding any defects identified during the comparison may be stored in the defect data 48.

R. Second Example Embodiment

In a second example embodiment, as best seen in FIG. 4, the system for inspecting the tire 10 includes the smart phone 41, which is an embodiment of the computing device 40, and pneumatic source 30 with a manual control 34. The second example embodiment permits a user to manually position the tire 10, to manually control the pneumatic source 30 to inflate the tire 10 and to position the infrared camera 20, which is integrated into the smart phone 41, to capture frames of data to detect a defect.

To perform an inspection, the user holds the tire 10 and positions the infrared camera 20 to cover a section 62 of the tire 10. The section 62 of the tire may cover the tread 13 or the sidewall 15 of the tire. The user operates (e.g., presses) the manual control 34 so that the pneumatic source 30 inflates the tire 10. When the tire 10 is inflated to a predetermined pressure, the pneumatic source 30 automatically shuts off. The user positions the smart phone 41 so that the field-of-view covers the tread 13 (e.g., field-of-view 22) or the sidewall 15 (e.g., field-of-view 24) of the section 62. The user operates the infrared camera 20 of the smart phone 41 to capture the reference frame 100 of the section 62. After period of time, the infrared camera 20 captures one or more subsequent frames of the section 62. The smart phone 41, and in particular the processing circuit 42 of the smart phone 41, compares the reference frame 100 to the one or more subsequent frames 106 to detect whether a portion of the section 62 has experienced a decrease in temperature.

The user then manually rotates the tire 10 to the next section of the tire 10. The user then holds the tire 10 while the infrared camera 20 of the smart phone 41 captures a reference frame 100 and one or more subsequent frames 106 of the next section. The user continues to manually rotate the tire 10 to the next section of the tire 10 until all sections of the tire have been inspected. As with any other implementation, the smart phone 41 may store the data captured during the inspection in the captured data 49 and any data related to defects in the defect data 48. The smart phone 41 may display any of the captured data 49 and/or the defect data 48 on the display 44 of the smart phone 41.

The second example embodiment may further include a server 70 and a database 72. The smart phone 41 may transmit the captured data 49 to the server 70 via communication link 76 and network 74. The communication link 76 may be a wireless communication link. The server 70 may compare the reference frames 100 to the one or more subsequent frames 106 to determine whether there any defects in the tire 10. If the smart phone 41 performed the defect analysis and stored the results as the defect data 48, the smart phone 41 may further transmit the defect data 48 to the server 70. The server 70 may store the captured data 49 and the defect data 48 in the database 72.

S. Third Example Embodiment

In a third example embodiment, as best seen in FIG. 5, the system for inspecting the tire 10 includes a ramp support 88 that has a ramp-like shape. The ramp support 88 enables a vehicle 17 to pull on to the ramp support 88 so that the tire 10 may be inspected while the tire 10 and wheel 19 are mounted to the vehicle 17.

The third example embodiment of the system operates as any other embodiment of the system. The tire positioner 60 successively positions the sections 62 of the tire 10 in the field-of-view 22 or 24 of one or more infrared cameras 20. The pneumatic source 30 inflates the tire 10. The one or more infrared cameras 20 capture a reference frame 100 of the section 62 after the tire 10 is inflated. After a period of time, the one or more infrared cameras 20 capture one or more subsequent frames 106 of the section 62. The computing device 40, and in particular the processing circuit 42, compares the reference frame 100 to the one or more subsequent frames to identify a portion of the section 62 that experienced a decrease in temperature. The decrease in temperature indicates a defect 164 in the tire 10. The computing device 40 records all of the captured information in captured data 49 and all of the data regarding the defect in the defect data 48.

After the test is complete, the vehicle 17 may pull off of the ramp support 88. If no defect was found, the vehicle may continue on his journey. If a defect is found, the tire may be removed so that the defect 164 may be repaired. After the tire 10 is removed from the vehicle 17, the origin indicia 65, the section indicia 64 and the direction of rotation 67 may be used to identify the physical location of the defect 164 on the tire 10.

T. Fourth Example Embodiment

Figure 6:
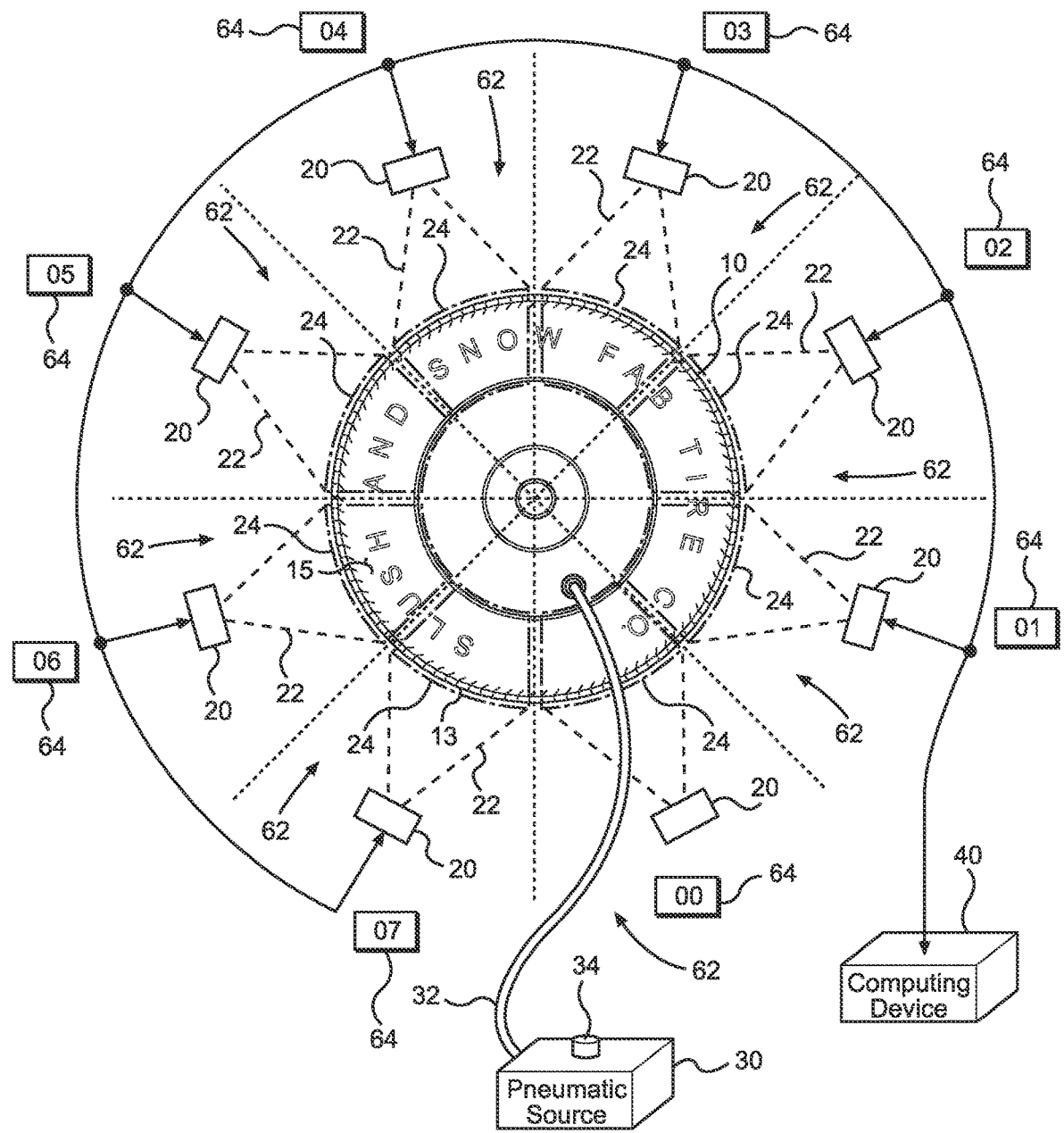
FIG. 6 is a top view of a fourth example embodiment of the tire defect detection system.
Figure 7:
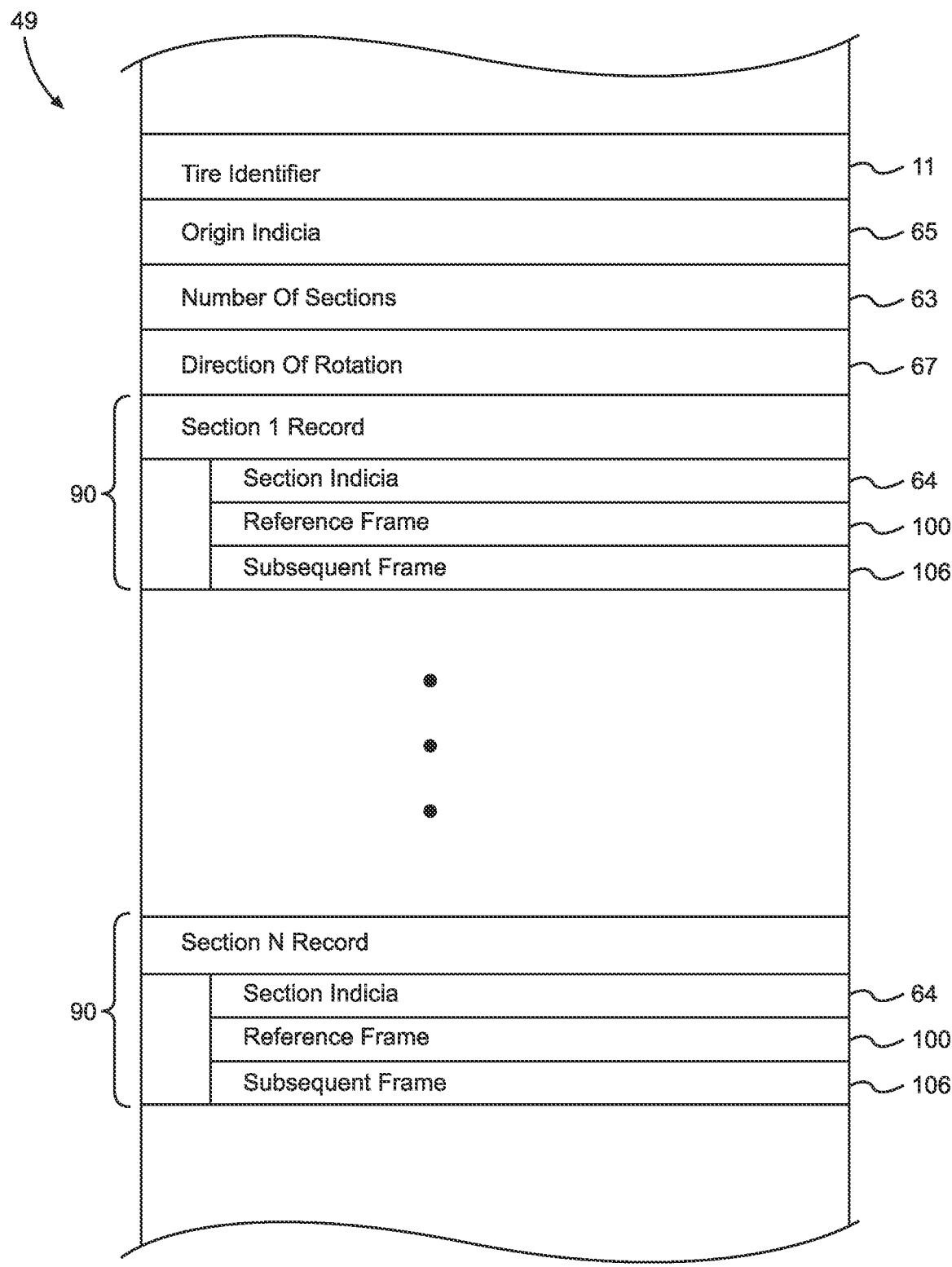
FIG. 7 is a diagram of an example data structure for storing the captured data.
Figure 8:
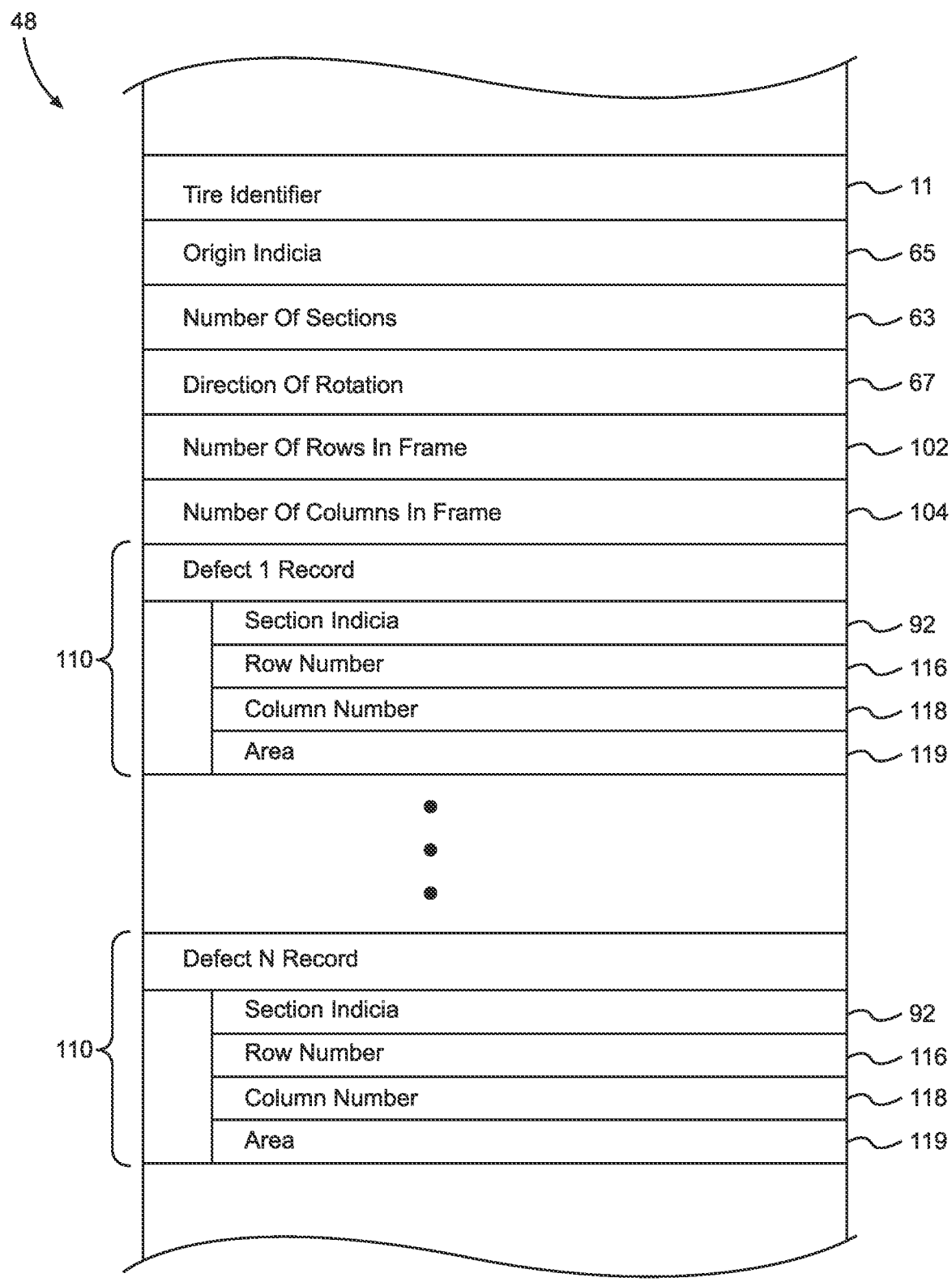
FIG. 8 is a diagram of an example data structure for storing the defect data.

In a fourth example embodiment, as best seen in FIG. 6, the system for inspecting the tire 10 includes a plurality of infrared cameras 20, the pneumatic source 30 and the computing device 40.

The fourth example embodiment includes two infrared cameras 20 for each section of the tire 10. As shown in FIG. 2, the tire is divided into eight sections. The eight infrared cameras 20 whose field-of-view 22 is oriented to capture frame data of the tread 13 of each section 62 of the tire 10 are shown in FIG. 6. The eight infrared cameras 20 whose field-of-view 24 is oriented to capture frame data of the sidewall 15 of the tire 10 are not shown in FIG. 6 to improve the clarity of the figure.

The pneumatic source 30 inflates the tire 10. After the tire 10 100 is been inflated, each respective infrared camera 20 captures a respective reference frame of the tread 13 and the sidewall 15 of each section 62 of the tire 10. After a period of time, the infrared cameras 20 capture one or more respective subsequent frames 106 of the tread 13 and the sidewall 15 for each section 62 of the tire 10. The reference frame 100 and the one or more subsequent frames 106 from each infrared camera 20 is stored in the captured data 49. The infrared cameras 20 may capture the frames of the sections of the tire 10 at the same time, thereby making the data capture fast and efficient. A further set of eight infrared cameras 20 may be used to capture the rear sidewall 15 of the tire 10.

Once the reference frame 100 and one or more subsequent frames 106 are captured for each section 62, the data may be analyzed for each section 62 as discussed herein to identify defects 164 in the tire 10.

U. Fifth Example Embodiment

In a fifth example embodiment, the system for inspecting the tire 10 includes the pneumatic source 30, the infrared camera 20, the tire positioner 60 and the processing circuit 42. The pneumatic source 30 is adapted to inflate the tire 10. The infrared camera 20 has a field-of-view 22. The tire positioner 60 is adapted to position the tire 10. The processing circuit 42 adapted to control the pneumatic source 30, the tire positioner 60 and the infrared camera 20.

To inspect a section 62 of the tire 10, the tire positioner 60 positions the section 62 in the field-of-view 22 of the infrared camera 20. The pneumatic source 30 inflates the tire 10. The infrared camera 20 captures a reference frame 100 of the section 62 of the tire 10 after the tire 10 is inflated. After a period of time, the infrared camera 20 captures a subsequent frame 106 of the section 62 of the tire 10. The processing circuit 42 compares the reference frame 100 to the subsequent frame 106 to detect a decrease in the temperature of the portion of the section 62. The decrease in the temperature occurs during the period of time between capture of the reference frame 100 and capture of the subsequent frame 106. The decrease in the temperature of the portion of the section 62 indicates the defect 164.

The inspection of the tire 10 may also be controlled by the processing circuit 42. The processing circuit 42 may execute a stored program 47 to perform the inspection of the tire 10. In response to executing the stored program 47, the processing circuit 42 instructs the tire positioner 60 to position a section 62 of the tire 10 in the field-of-view 22 of the infrared camera 20, instructs the pneumatic source 30 to inflate the tire 10 and instructs the infrared camera 20 to capture a reference frame 100 of the section 62. After a period of time, the processing circuit 42 instructs the infrared camera 20 to capture a subsequent frame 106 of the section 62. After the infrared camera 20 has captured the reference frame 100 and the subsequent frame 106, the processing circuit 42, still responsive to the stored program 47, compares the reference frame 100 to the subsequent frame 106 to detect a decrease in a temperature of a portion of the section 62. The decrease in the temperature occurs during the period of time between capture of the reference frame 100 and capture of the subsequent frame 106. the decrease in the temperature of the portion of the section 62 indicates the defect 164.

The first example embodiment may inspect a single section 62 of the tire 10, some of the sections of the tire 10 or all of the sections 62 of the tire 10. When inspecting some or all of the sections 62 of the tire 10, the first example embodiment of the system successively inspects the sections 62 by capturing a reference frame 100 and at least one subsequent frame 106 for each section 62 and by comparing the reference frame 100 and the at least one subsequent frame 106 to each other as discussed herein.

V. Sixth Example Embodiment

In a sixth example embodiment, the system for inspecting the tire 10 includes the pneumatic source 30, the infrared camera 20, the tire positioner 60, the support 80, the communication circuit 45, the database 72, the server 70, the display 44, and the processing circuit 42. The pneumatic source 30 is adapted to inflate the tire 10. The infrared camera 20 has a field-of-view 22. The tire positioner 60 is adapted to position the tire 10. The support 80 is adapted to support the tire 10 for positioning by the tire positioner 60. The communication circuit 45 is adapted to transmit and receive data. The database 72 is adapted to store data. The server 70 is adapted to manage the database 72. The display 44 is adapted to present images for viewing by the user. The processing circuit 42 is adapted to control the pneumatic source 30, the tire positioner 60, the infrared camera 20 and the communication circuit 45.

To inspect a section 62 of the tire 10, the tire positioner 60 positions the section 62 of the tire 10 in the field-of-view 22 of the infrared camera 20. The pneumatic source 30 inflates the tire 10. The infrared camera 20 captures a reference frame 100 of the section 62 of the tire 10 after the tire 10 is inflated. After a period of time, the infrared camera 20 captures a subsequent frame 106 of the section 62 of the tire 10. The processing circuit 42 transmits the reference frame 100 and the subsequent frame 106 to the server 70 via the communication circuit 45. The server 70 compares the reference frame 100 to the subsequent frame 106 to detect a decrease in the temperature of a portion of the section 62. The decrease in the temperature occurs during the period of time between capture of the reference frame 100 and capture of the subsequent frame 106. The decrease in the temperature of the portion of the section 62 indicates a defect 164. The server 70 stores at least one of the reference frame 100, the subsequent frame 106 and the result of comparing in the database 72. The display 44 presents an image of the defect 164 to the user.

W. Example Method for Frame Capture

All embodiments of the system include capturing reference frames 100 and one or more subsequent frames 106. Some embodiments analyze only the one or more subsequent frames 106 to identify the defects 164. Other embodiments compare the one or more subsequent frames 106 to the reference frame 100 to identify the defects 164. Other embodiments subtract one of the subsequent frames 106 from the reference frame 100 to form the difference frame 108 and the difference frame 108 is analyzed to identify the defects 164.

Figure 12:
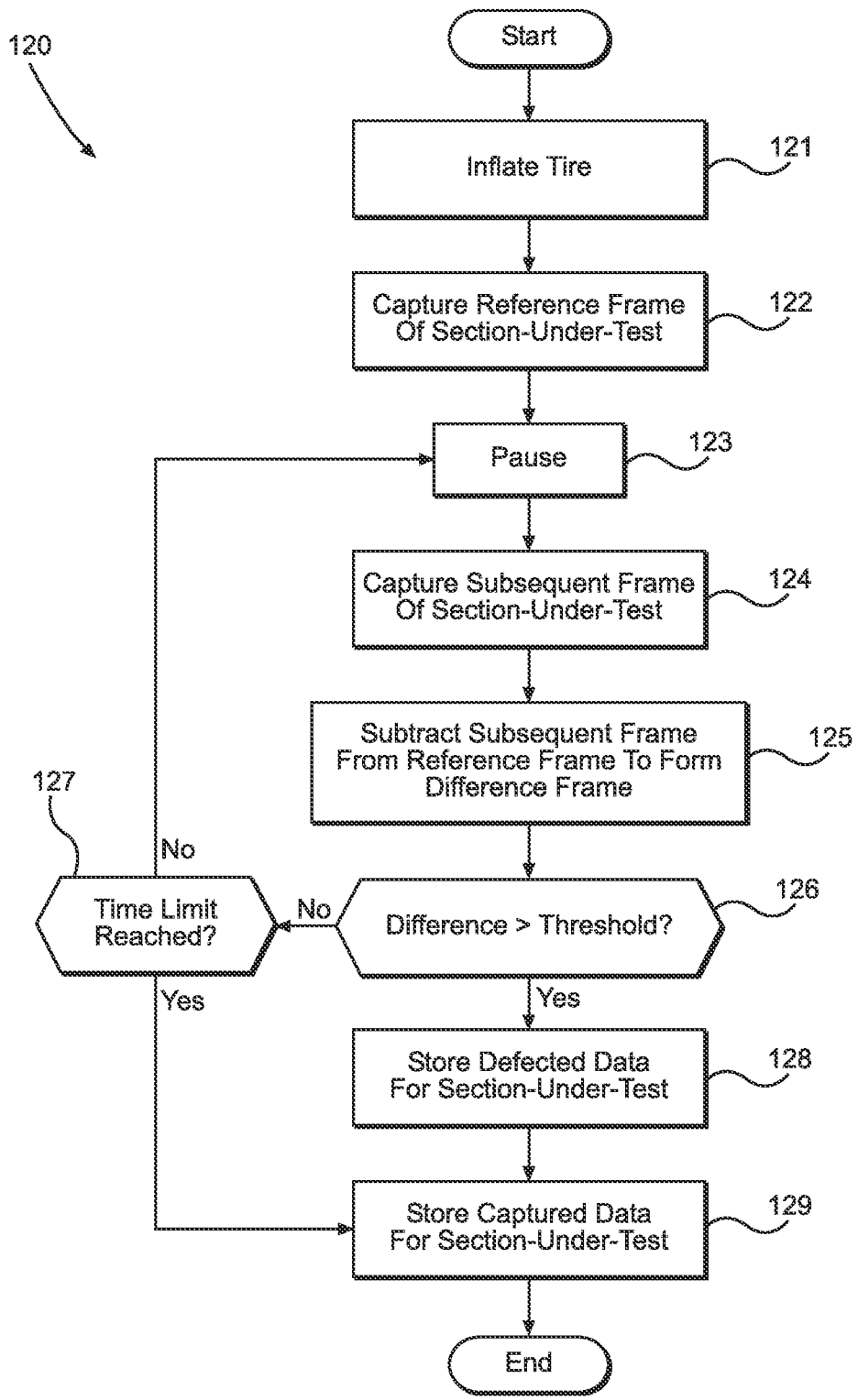
FIG. 12 is a flow chart of an example method for frame capture.
Figure 13:
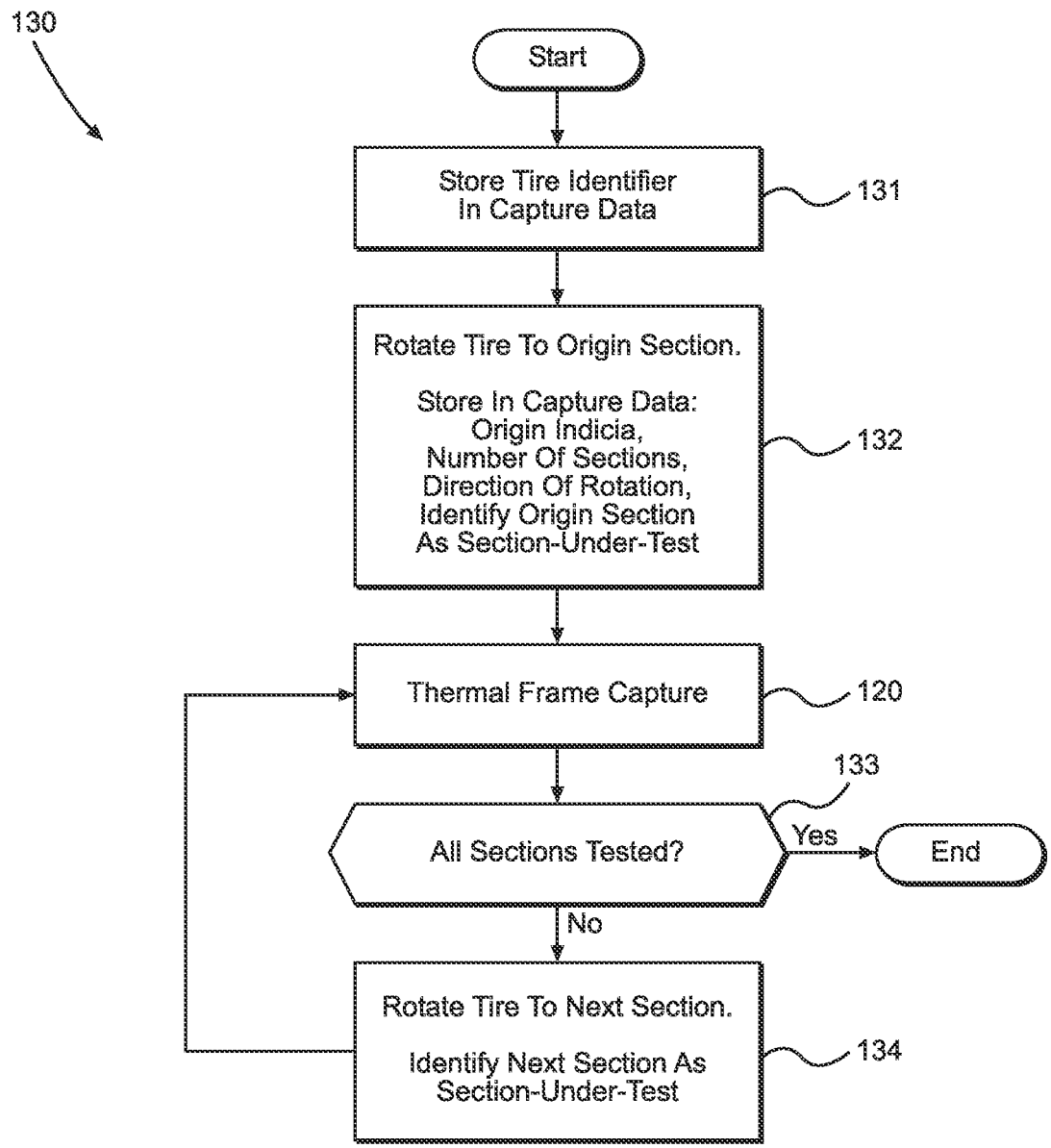
FIG. 13 is a flow chart of a first example method for inspecting a tire and identifying defects.
Figure 14:
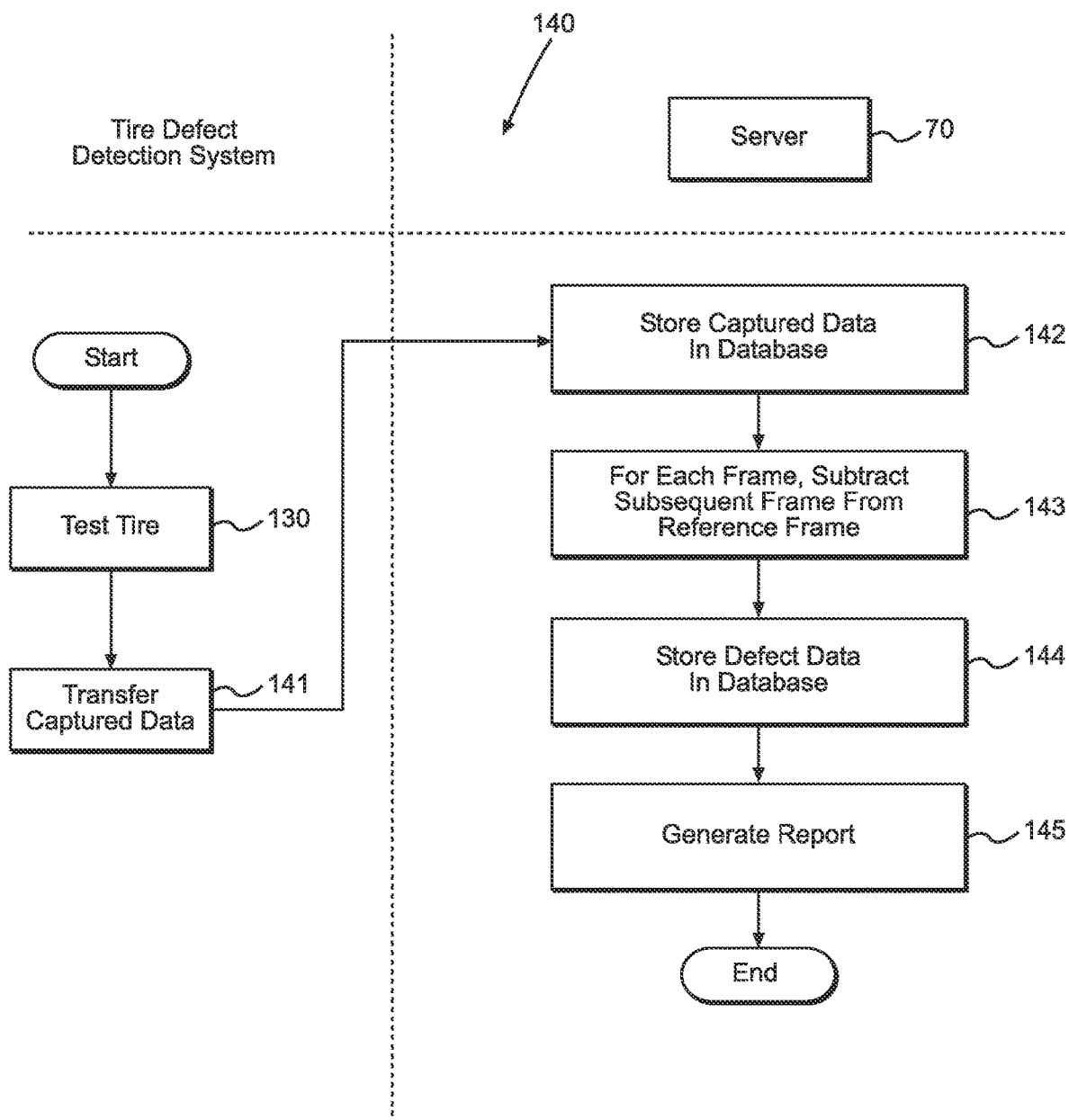
FIG. 14 is a swim lane diagram of a second example method for inspecting a tire and identifying defects.

The example method of FIG. 12 is an example of a method for capturing a reference frame 100, capturing a subsequent frame 106, subtracting the subsequent frame 106 from the reference frame 100 to form the difference frame 108 and storing the reference frame 100, the subsequent frame 106, and the difference frame 108 for analysis. The method frame capture 120 includes inflate 121, capture reference 122, pause 123, capture subsequent 124, subtract 125, threshold 139, time limit 127, store 128 and identify 129.

In the step inflate 121, the pneumatic source 30 inflates the tire 10. The pneumatic source 30 inflates the tire 10 to a pre-determined pressure. The pneumatic source 30 stops inflating the tire 10 when the pressure of the tire 10 reaches the predetermined pressure.

In the step capture reference 122, the infrared camera 20 captures a reference frame 100 of the section 62 of the tire 10 covered by the field-of-view (e.g., 22, 24) of the infrared camera 20. The section 62 which is presently in the field-of-view of the infrared camera 20 is referred to as the section-under-test.

In the step pause 123, the performance of the method pauses for a period of time. The period of time is to allow air to escape through the tire 10 if there is a defect in the tire 10. Air that escapes to the defect will cool the area of the tire 10 around the defect 164 thereby enabling detection of the defect 164.

In the step capture subsequent 124, performed after the step pause 123, the infrared camera 20 captures a subsequent frame 106 of the section-under-test.

In the step subtract 125, the subsequent frame 106 is subtracted from the reference frame 100 to find a different between the reference frame 100 and the subsequent frame 106. Because the infrared camera 20 captures thermal data of the section-under-test, a difference between the reference frame 100 and the subsequent frame 106 will include the difference in temperature. In particular, the difference in temperature may occur in the portion of the section-under-test where there is a defect 164.

In the step threshold 139, the difference between the reference frame 100 and the subsequent frame 106 is compared to a threshold. Comparing the difference to a threshold may be used to determine whether the difference indicates a defect 164. If there is a defect located in the section-under-test, the air escaping through the defect 164 will decrease the portion of the tire 10 around the defect 164 as compared to the remainder of the section-under-test. The defect 164 may result in a decrease in the temperature of the portion of the section-under-test as small as 0.1 degrees. Depending on the size of the defect 164, the temperature may decrease several (e.g., more than two) degrees. The temperature may be measured as Celsius or Fahrenheit degrees. If the decrease in temperature is less than the threshold, then it is likely that there is no defect 164 or that there has not been enough time for the air escaping from the defect 164 to sufficiently cool the tire.

If the difference is greater than the threshold, then it is likely that a defect 164 exists, so execution of the method continues with the step store 128. If the difference is less than the threshold, then it is likely that a defect 164 does not exist or there has not been a sufficient lapse of time to cool the tire 10 around the defect 164. If the difference is less than the threshold, execution of the method continues with the step time limit 127.

In the step time limit 127, the method determines whether a time limit for determining whether a defect 164 exists in the section-under-test has been reached. The time limit is the maximum amount of time allowed to find a difference in temperature that is greater than the threshold. The time limit is a maximum amount of time that is allowed for air to escape from the defect 164 in the tire 10 to lower the temperature of the portion of the section-under-test. If the defect 164 is not in the section-under-test, the tire 10 may completely deflate without changing the temperature of a portion of the section-under-test. If the time limit has not been reached, then execution of the method continues with the step pause 123. If the time limit has been reached, then execution of the method continues with the step identify 129.

In the step store 128, the defect data for the section-under-test is stored in the defect data 48. If the defect data is anything more than the result of subtracting the subsequent frame 106 from the reference frame 100 as performed in the step subtract 125, then the step store 128 performs the additional analysis required to determine the defect data 48 for the section-under-test. For example, the step store 128 may include performing blob detection on the reference frame 100, the subsequent frame 106 and/or the difference frame 108. The defect data 48 may include the location (e.g., row, column) of the defect 164 in the section-under-test and thermal images of the defect 164.

In the step identify 129, the results of subtracting the subsequent frame 106 from the reference frame 100 as performed in the step subtract 125, is identified as the difference frame 108. In the step identify 129, the data captured while performing the method, including the reference frame 100, the subsequent frame 106 and the difference frame 108 are stored in the captured data 49.

X. Example Methods of Tire Inspection

The tire 10 may be inspected using various embodiments of inspection methods. In a first example embodiment, the tire test method 130 includes store 131, rotate to origin 132, frame capture 120, all sections 133, and rotate 134.

In the step store 131, the tire identifier 11 for the tire-under-test is stored in the captured data 49. The tire identifier 11 may include the serial number of the tire, as discussed above. The tire identifier 11 may include photographs of the tire sufficient to identify the tire.

In the step rotate to origin 132, the tire 10 is rotated to position the origin section of the tire 10 in the field of view (e.g., 22, 24) of the infrared camera 20. Information regarding the origin section including the origin indicia 65, the number of sections 63 and the direction of rotation 67 are stored in the captured data 49. Once positioned in the field of view of infrared camera 20, the origin section is identified as the section-under-test.

In the frame capture 120, all of the steps of the method frame capture 120 are performed to capture the reference frame 100, the subsequent frame 106 and the difference frame 108 each of which is stored in the captured data 49 in a section record 90 for the section-under-test. The frame capture 120 further identifies any defects 164 in the section-under-test, if any, and stores the information regarding the defect 164 in the defect data 48.

In the step all sections 133, it is determined whether all sections 62 of the tire have had a turn at being the section-under-test. The number of sections 62 was determined in the step rotate to origin 132, so it possible to determine when all of the sections 62 of the tire 10 have had their turn being the section-under-test and the data has been collected for each section 62 of the tire 10.

If all the sections of the tire have been tested, then the method is finished and ends. If all of the sections of the tire 10 have not been tested, then execution continues with the step rotate 134.

In the step rotate 134, the tire is rotated to the next section that has not been tested and this next section becomes the section-under-test. Execution then moves to the step frame capture 120 and data is captured regarding this new section-under-test and the defects 164, if any, are identified.

A second example embodiment of a method for inspecting the tire 10 includes inflating the tire 10, capturing a reference frame 100, capturing a subsequent frame 106 and comparing the reference frame 100 to the subsequent frame 106. The step of inflating the tire 10 includes inflating the tire 10 to a pre-determined pressure.

The step of capturing the reference frame 100 includes capturing the reference frame 100 of a section 62 of the tire using an infrared camera 20. The section 62 of the tire 10 is the section 62 that is presently within the field-of-view (e.g., 22, 24) of the infrared camera 20. The infrared camera 20 captures the reference frame 100 shortly or immediately after the tire 10 is inflated. The step of capturing the subsequent frame 106 includes after a period of time includes capturing the subsequent frame 106 of the section 62 using the infrared camera 20.

The step comparing the reference frame 100 to the subsequent frame 106 includes comparing the reference frame 100 to the subsequent frame 106 to detect a decrease in a temperature of a portion of the section 62. The decrease in the temperature occurs during the period of time between capture of the reference frame 100 and capture of the subsequent frame 106. The decrease in the temperature of the portion of the section 62 indicates a defect 164.

Y. Example Methods of Defect Detection by a Server

As discussed above, a system for inspecting the tire 10 may capture data regarding the sections 62 of the tire 10, then provide the captured data 49 to the server 70 to analyze the data to determine whether a defect 164 exists in any of the sections 62 of the tire.

In an example method, the system for inspecting the tire 10 performs the example method test tire 130, which captures data regarding each section of the tire 10. The example method frame capture 120, discussed above, is executed by the example method test tire 130. The example method frame capture 120 includes detecting whether the section-under-test includes a defect 164. Since in this example method, the server 70 will use the captured data 49 to determine whether there any defects 164 in the tire 10, any defect detection done by the example method frame capture 120 may be omitted. However, the example method frame capture 120 may include determining the difference frame 108 (e.g., subtract 125), storing the difference frame 108 in the captured data 49 (e.g., identify 129) and sending the differential frame to the server 70 as part of the captured data 49.

In the step transfer 141, the system for inspecting the tire 10 transfers the data captured while inspecting the tire 10 to the server 70. The data transferred may include only the captured data 49 if defect detection is omitted from the example method test tire 130. The data transferred may include the captured data 49 and the defect data 48 if defect detection is included in the example method test tire 130. The data may be transferred from the system for inspecting the tire 10 using the communication circuit 45, the communication link 76 and the network 74.

In the step store 142, the server 70 receives the data from the system and stores the data in the database 72. If the data received from the system includes only the captured data 49, the server 70 stores only the captured data 49 in the database 72. If the data received from the system includes the captured data 49 and the defect data 48, the server 70 stores the captured data 49 and the defect data 48 in the database 72.

If the data received from the system does not include the difference frame 108 or the defect data 48, the step subtract 125 is performed by the server 70 to determine the difference frame 108 and the defect data 48. In the event that the server 70 performs the step subtract 125, the server 70 accesses the captured data 49 from the database 72 to perform the step subtract 125.

If the server 70 performs the step subtract 125, then the server 70 executes the step store 128 to store the defect data 48 in the database 72. If the server 70 received the defect data 48 from the system, then the defect data 48 is already stored in the database 72.

In the step generate 145, the server 70 generates a reports regarding the tire 10, regarding the captured data 49 and/or the defect data 48. The report may include any or all data from the captured data 49 and/or the defect data 48. The report may include images of the difference frame 108 and/or any other frame created during defect analysis. The frames that are part of the report may be presented on the display 44 for viewing by a user.

The report may further use historical data stored for a specific tire 10 to generate the report. The step generate 145 may use any analysis techniques and/or mathematical techniques (e.g., statistics) to generate the report to provide information regarding the tire 10 to the user.

Z. Example Method for Frame Subtraction

As discussed in several places herein, the subsequent frame 106 may be subtracted from the reference frame 100. For example, the step subtract 125 subtracts the subsequent frame 106 from the reference frame 100.

The example method subtraction 150 is an example method for performing pixel-wise subtraction the subsequent frame 106 from the reference frame 100. The method subtraction 150 is described as pseudocode for execution by the processing circuit 42. The pseudocode includes the for statement 151 that steps through each row of the frame data (e.g., reference frame 100, subsequent frame 106) and a for statement 152 that steps through each column of the frame data. The mathematical formula described as Diff (Row, Column) in step 153 performs the actual subtraction of the value of a pixel (e.g., value (Row, Column) from the subsequent frame 106 from the value (e.g., value (Row, Column) of the corresponding pixel from the reference frame 100. The result other subtraction may be stored in the corresponding pixel of the difference frame 108.

The for step 151 addresses each row of the reference frame 100 and subsequent frame 106 in order from zero to the last row, which is identified as row G. The for step 152 addresses each column of the reference frame 100 and subsequent frame 106 in order from zero to the last column, which is identified as column F. The for steps 151 and 152 access one pixel (e.g., pixel Row, Column) of the reference frame 100 and the corresponding pixel (e.g., pixel Row, Column) of the subsequent frame 106 at a time. For example, when the method subtraction 150 begins, Row is equal to zero and Column=zero, so the value of the (0, 0) pixel in the subsequent frame 106 is subtracted from the value of the (0, 0) pixel in the reference frame 100. The result of the subtraction is stored in the (0, 0) pixel of the difference frame 108.

The value of Column variable is incremented so that the next pixel value of the (0, 1) pixel in the subsequent frame 106 is subtracted from the value of the (0, 1) pixel in the reference frame 100. The result of the subtraction is stored in the (0, 1) pixel of the difference frame 108. The Column variable is incremented until it is equal to F. After subtraction of the value of the (0, F) pixel from the subsequent frame 106 is subtracted from the value of the (0, F) pixel in the reference frame 100 and the result stored in the (0, F) pixel of the difference frame 108, the Column variable is set to zero and the Row variable is incremented to one, so the value of the (1, 0) pixel in the subsequent frame 106 is subtracted from the value of the (1, 0) pixel in the reference frame 100. The result of the subtraction is stored in the (1, 0) pixel of the difference frame 108. The Column and Row variables are incremented and the difference taken until the Column and Row variables reach the (G, F) pixel, which is last pixel in the frame.

Upon completion of the method subtraction 150, the value of each pixel in the subsequent frame 106 has been subtracted from the corresponding value of the pixel in the reference frame 100 and the result has been stored in the corresponding pixel of the difference frame 108.

AA. Operation of Preferred Embodiment

In use, referring to a fully automated system, a user places the tire 10 on the tire spindle 82 and positions the tire 10 over the tire positioner 60. The user slides the pneumatic collar 36 over the tire spindle 82 and connects the hose 38 to the valve stem 12 of the tire 10. The tire positioner 60 rotates the tire 10 to position a predefined origin section (e.g., valve stem 12 in center of the section) in the field-of-view 22 or 24. Alternatively, the system may record origin indicia thereby making any section of the tire the origin section. Once the tire has been positioned so that the origin section is positioned in field-of-view 22 or 24 of the first infrared camera 20 camera or the second infrared camera 20, the rotary encoder 68 may be reset so that the section indicia 64 of the origin section is zero (e.g., 00). The section 62 of the tire 10 that is positioned in the field-of-view 22 or 24 is referred to as the section-under-test.

Pneumatic source 30 inflates the tire 10. As the tire 10 is being inflated, the heat source 50 heats the section-under-test. Shortly or immediately after the tire 10 is inflated, the temperature sensor 52 detects the temperature of the section-under-test. Further, the first infrared camera 20 and/or the second infrared camera 20 capture a reference frame 100 of the tread 13 and/or sidewall 15 respectively of the section-under-test. The system waits for a period of time to allow air to escape from any defects 164. After the period of time, first infrared camera 20 and/or the second infrared camera 20 capture a subsequent frame 106 of the tread 13 and/or the sidewall 15 of the section-under-test.

After the subsequent frame 106 has been captured, the tire positioner 60 rotates the tire 10 to a next section of the tire 10, so that the next section becomes the section-under-test. The tire positioner 60 knows the number of sections for the tire 10 or the size of the sections of tire 10, so the tire positioner 60 may accurately rotate the tire to the next section. The system then repeats inflating the tire 10 and capturing the reference frame 100 and the subsequent frame 106.

The system rotates the tire 10 and captures the frame data (e.g., reference frame 100, subsequent frame 106) until all sections of the tire 10 have been inspected. The processing circuit 42 of the computing device 40 may store the captured data as the captured data 49 in the memory 46. The processing circuit 42 may also compare the subsequent frame 106 to the reference frame for each section 62 to determine whether a defect 164 exists in any of the sections 62. The processing circuit 42 may store data regarding any defects 164 detected in the defect data 48 in the memory 46.

The system may present any data on the display 44 (not shown) for viewing by the user. The data presented may include images, such as the reference image 160, the subsequent image 162, the difference image 166 and/or any data determined by the processing circuit 42 including any or all defect data 48.

A system may also be used for identifying the locations of any defects 164 after the initial inspection of the tire 10. In use, the user may place the tire 10 and the pneumatic collar 36 on the tire spindle 82. The processing circuit 42 may access the captured data 49 to retrieve the origin indicia 65, the number of sections 63 and the direction of rotation 67. The system rotates the tire 10 until the origin section is positioned in the field-of-view 22 of the first infrared camera 20 or the field-of-view 24 of the second infrared camera 20. The system may include a vision system for identifying features of the tire 10 so that the tire may be rotated to position the origin section in the fields-of-view of the first infrared camera 20 and/or the second infrared camera 20. The processing circuit 42 accesses the defect data 48 and uses the defect records 110 to rotate the tire to each section that has a defect 164. The display may present an image of the section of the tire 10 so that the defect 164 and the location of the defect in the section 62 may be seen by the user.

Unless otherwise defined, all technical and scientific terms used herein have the same meaning as commonly understood by one of ordinary skill in the art to which this invention belongs. Although methods and materials similar to or equivalent to those described herein can be used in the practice or testing of the various embodiments of the present disclosure, suitable methods and materials are described above. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls. The various embodiments of the present disclosure may be embodied in other specific forms without departing from the spirit or essential attributes thereof, and it is therefore desired that the various embodiments in the present disclosure be considered in all respects as illustrative and not restrictive. Any headings utilized within the description are for convenience only and have no legal or limiting effect.

What is claimed is:

1. A method for inspecting a tire, the method comprising:
(a) inflating the tire with an expanding gas;
(b) capturing a reference frame of a section of the tire using an infrared camera;
(c) pausing capture of the infrared camera for a period of time enabling air to escape through the tire in the presence of a defect in the tire, wherein escaping air cools an area of the tire around the defect;
(d) after pausing, capturing a subsequent frame of the section;
(e) comparing the reference frame to the subsequent frame to identify a difference in temperature;
(f) comparing the difference in temperature to a threshold temperature;
(g) if the difference in temperature is greater than the threshold temperature, determining that a defect exists and storing defect data;
(h) if the difference in temperature is less than the threshold temperature:
determining that the amount of time, as measured from the start of the pause, has exceeded the threshold amount of time indicating the absence of the defect; or
determining that an amount of time, as measured from a start of the pause, has not exceeded a threshold amount of time, repeating steps (c)-(h).

2. The method of claim 1, further comprising defining the tire as having a plurality of equivalent sections with each equivalent section having a same number of degrees relative to a 360 degree circumference of the tire.

3. The method of claim 1, further comprising inflating the tire to a predetermined pressure.

4. The method of claim 1, further comprising heating the tire while inflating the tire.

5. The method of claim 1, further comprising heating the section of the tire while inflating the tire.

6. The method of claim 1, further comprising performing analysis on the defect data of the section including blob detection.

7. The method of claim 1, wherein the defect data includes the difference in temperature.

8. The method of claim 7, wherein the defect data additionally includes a location the defect in the section.

9. The method of claim 8, wherein the location of the defect is identified by an assigned column and row within the section.

10. The method of claim 1, further comprising rotating the tire to a new section of the tire and repeating steps (a)-(h) for the new section of the tire.

11. The method of claim 10, wherein rotating the tire comprises manually rotating the tire.

12. The method of claim 10, wherein rotating the tire comprises automatically rotating the tire.

13. The method of claim 10, wherein rotating the tire occurs while the tire is removed from a vehicle.

14. The method of claim 10, wherein rotating the tire occurs while the tire remains attached to a vehicle.

15. The method of claim 1, wherein the threshold amount of time comprises a predetermined maximum amount of time that is allowed for air to escape from the defect.

16. The method of claim 1, wherein upon determining that the amount of time, as measured from the start of the pause, has exceeded the threshold amount of time indicating the absence of the defect, responsively storing non-defect data including the reference frame, the subsequent frame, and the difference in temperature.

17. The method of claim 1, further comprising generating an image of the tire with any determined defects and displaying the image.

18. The method of claim 1, further comprising repeating steps (a)-(h) for each of a plurality of sections of the tire and responsive to completing steps (a)-(h) for each of the plurality of section of the tire, automatically rotating to the tire to a position where at least one of any determined defect is presented for repair, wherein the automatic rotation is based on a determined location of the at least one of any determined defect.

19. The method of claim 1, wherein the method is executed by a system for inspecting the tire and wherein the system includes:
 a pneumatic source that inflates the tire;
 an infrared camera having a field-of-view of the section of the tire;
 a computing device that controls operation of the pneumatic source and the infrared camera according to the method, wherein the computing device includes a memory in which any defect data or non-defect data is stored.

20. The method of claim 19, wherein the system additionally includes a tire positioner controlled by the computing device to rotate the tire to place the section in the field-of-view of the infrared camera.

* * * * *